(12) United States Patent
Shao et al.

(10) Patent No.: US 11,545,895 B2
(45) Date of Patent: Jan. 3, 2023

(54) PRECHARGE IN A SWITCHED CAPACITOR (SC) CONVERTER

(71) Applicant: NXP B.V., Eindhoven (NL)

(72) Inventors: Bin Shao, Chandler, AZ (US); Sri Harsh Pakala, Chandler, AZ (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/303,699

(22) Filed: Jun. 4, 2021

(65) Prior Publication Data

US 2022/0393577 A1 Dec. 8, 2022

(51) Int. Cl.
*H02M 3/07* (2006.01)
*H02J 7/00* (2006.01)

(52) U.S. Cl.
CPC .......... *H02M 3/07* (2013.01); *H02J 7/00712* (2020.01)

(58) Field of Classification Search
CPC ..................................................... H02M 3/07
See application file for complete search history.

(56) References Cited

U.S. PATENT DOCUMENTS

| | | | |
|---|---|---|---|
| 8,503,203 B1 | 8/2013 | Szczeszynski et al. | |
| 9,484,799 B2 | 11/2016 | Zhang et al. | |
| 10,312,724 B2 | 6/2019 | Christiaans et al. | |
| 10,680,512 B2 | 6/2020 | Babazadeh et al. | |
| 11,424,629 B1* | 8/2022 | Han | H02J 7/0063 |
| 2013/0099579 A1* | 4/2013 | Murray | H02J 7/0018 307/82 |
| 2017/0163160 A1* | 6/2017 | Din | H02J 7/0018 |
| 2022/0094277 A1* | 3/2022 | Han | H02J 7/02 |
| 2022/0149644 A1* | 5/2022 | Liu | H02J 7/0031 |

OTHER PUBLICATIONS

Assem et al.: "Hybrid Dickson Switched-Capacitor Converter With Wide Conversion Ratio in 65-nm CMOS", IEEE Journal of Solid-State Circuits, pp. 1-16.

* cited by examiner

*Primary Examiner* — Sibin Chen

(57) ABSTRACT

A switched capacitor (SC) power stage includes a first stage circuit with a set of switches coupled in series, a first flying capacitor coupled to a first node between a first and second switch and to a second node between a fifth and sixth switch, a second flying capacitor coupled to a third node between the second and a third switch and to a fourth node between a seventh and eighth switch, and a third flying capacitor coupled to a fifth node between a third and fourth switch and a second terminal coupled to the second node. A control circuit establishes a first configuration of the switches to precharge the first, second, and third flying capacitors to a first voltage, and a second configuration of the switches to precharge the first and second flying capacitors to a second voltage while the third flying capacitor remains charged at the first voltage.

19 Claims, 19 Drawing Sheets

PRECHARGE IN A SWITCHED CAPACITOR (SC) CONVERTER

BACKGROUND

Field

This disclosure relates generally to a switched capacitor (SC) converter, and more specifically, to precharge in an SC converter.

Related Art

As the number of features and functionalities increase in smart handheld or mobile devices, such as smartphones, the complete system power consumption has also increased. This results in the batteries of such devices to discharge earlier than the previous generation of devise. Many such devices have both an inductive charger and a fast charger, in which the fast charger is used to reduce the time the end-user spends in charging a device. Current fast charging systems use multiple cascaded DC converters. However, cascading converters require increased circuit area while also resulting in increased power loss. Therefore, as power demands continue to increase, a need exists for fast chargers within these devices having improved efficiency in terms of power loss and circuit area.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one aspect, a fast charger of a smart mobile device includes a multiple-mode (multi-mode) switched capacitor (SC) converter capable of supporting multiple conversion ratios, including both forward conversion ratios (e.g. 4:1, 2:1, 1:1, etc.) and reverse conversion ratios (e.g. 1:4, 1:2, 1:1, etc.). This allows for performing both wired and wireless fast charging. An SC converter is a DC to DC converter, in which a forward conversion ratio is performed from input to output, while for a reverse conversion, the input and output are reversed. For example, an N:1 (forward) conversion ratio implies that the input voltage is N times the output voltage, while a 1:N (reverse) conversion ratio implies that the input voltage (which now provides the output) is 1/N of the output voltage (which now receives the input). A 1:1 ratio in the reverse mode implies that the input and output are at the same voltage level, and is useful for enabling reverses wireless charging by the smart mobile device of another device (e.g. another mobile device). In one embodiment, such an SC converter is implemented using a Dickson topology, which includes a number of switches as well as flying capacitors. Multiple conversion ratios can be achieved with the same Dickson topology by changing the switching actions for the switches.

Figure 1:
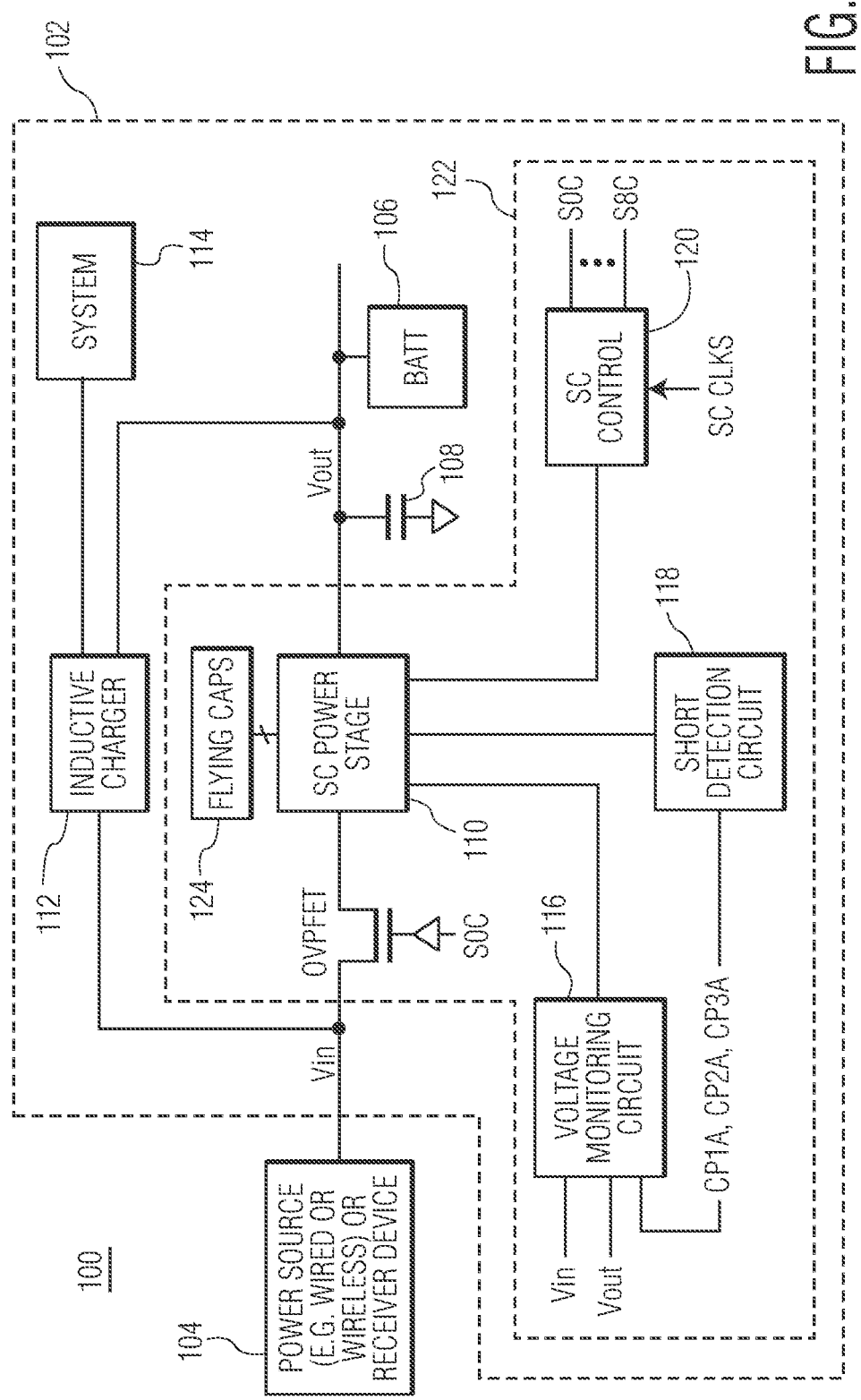
FIG. 1 illustrates, in partial block diagram and partial schematic form, a smartphone system, in accordance with one embodiment of the present invention.

FIG. 1 illustrates a smartphone system 100 which includes a smartphone 102 and a power source or receiver device 104. Smartphone 102 may be any type of device, such as any type of mobile device, and includes an inductive charger 112, a fast charger 122, an internal system 114, a battery 106 (which may be, e.g., a single cell lithium battery), and an output capacitor 108. Smartphone 102 includes an input voltage node, Vin, and an output voltage node, Vout. Inductive charger 112 is coupled to Vin, Vout, and internal system 114. Fast charger 122 includes an over-protection field effect transistor (OVPFET), an SC power stage 110 and flying capacitors (flying caps) 124, a voltage monitoring circuit 116, a short detection circuit 118, and an SC control circuit 120. Note that OVPFET, voltage monitoring circuit 116, short detection circuit 118, SC control circuit 120, and SC power stage 110 may be located within an integrated circuit or chip of smartphone 102, but flying capacitors 124 are located off-chip. (Note that smartphone 102 may include more than one integrated circuit.)

A first current electrode of OVPFET is coupled to Vin, and a second current electrode of OVPFET is coupled to SC power stage 110. SC power stage 110 is coupled to Vout, which is also coupled to capacitor 108 and battery 106. Flying caps 124 are coupled to SC power stage 10 (in which both flying caps 124 and SC power 110 will be illustrated in more detail in later drawings). Voltage monitoring circuit 116 is coupled to Vin, Vout, as well as nodes CP1A, CP2A, and CP3A corresponding to circuit nodes of SC power stage 110 to which flying capacitors 110 are coupled. Short detection circuit 118 is also coupled to CP1A, CP2A, and CPA, and SC control circuit 120 is coupled to each of voltage monitor circuit 116 and to short detection circuit 118. SC control circuit 120 also receives one or more SC clocks (SC clks) and provides control signals S0C to S8C to SC power stage 110.

In one embodiment, power source 104 may be a wired power source, such as an adapter plugged into a wall circuit which provides an input voltage at Vin. In one embodiment, the input voltage may be received via a USB type C connector. In another embodiment, power source 104 may be coupled via a wireless interface to provide an input voltage at Vin. In one embodiment, device 102 may include multiple Vin nodes, such as one connected to receive an input voltage from a wired source and another to receive an input voltage from a wireless source. Therefore, for this embodiment, Vin of FIG. 1 may be representative of multiple different input voltage nodes. In any of these embodiments, though, fast charger 122 would be configured in a forward mode to use the voltage at Vin to charge battery 106.

In yet another embodiment, rather than a power source 104, system 100 may include a receiver device 104 coupled to node Vin. In this embodiment, a receiver device 104 may be connected to device 102 such that its battery may be charged by battery 106 of device 102. In this case, fast charger 122 would instead be configured in a reverse mode in which an input voltage at node Vout would be used to provide an output voltage at Vin to receiver device 104.

Inductive charger 112 may be implemented as a conventional charger, such as a buck converter, which provides power to internal system 114 from battery 106. Internal system 114 may include various elements of device 102, such as, e.g., one or more cores, memories, peripherals (e.g. camera, speakers, display, etc.), etc. Inductive charger 112 may be referred to as the main charger, and while fast charger 122 charges battery 106 faster than the main charger, it does so by providing more current to battery 106 which adversely impacts battery longevity. Therefore, in one embodiment, fast charger 122 is only used when battery 106 is between a predetermined charging range (e.g. 30-80% of its charge capacity). Once battery 106 drops too low, though, such as below 30%, the main charger is instead used to charge battery 106 which provides reduced current as compared to the fast charger (but results in slower charging). Control circuitry within inductive charger 112 may control a voltage regulation loop to power internal system 114 and may also monitor the charges of battery 106 to determine the amount of charge it can accommodate (to determine, for example, if inductive charger 112 is needed to charge battery 106).

Fast charger 122 may be used to more quickly charge battery 106 as compared to inductive charger 112. As indicated above, fast charger 122 is used when battery 106 is within a predetermined charging range. In one embodiment, fast charger 122 is implemented with a switched capacitor (SC) converter to provide DC to DC conversion between Vin and Vout. In one embodiment, the SC converter implements a Dickson topology and can provide multiple conversion ratios, including both forward conversion ratios (e.g. 4:1, 2:1, 1:1, etc.) and reverse conversion ratios (e.g. 1:4, 1:2, 1:1, etc.). For example, for a 4:1 conversion ratio, if Vin is 20V, Vout is 5V. As another example, for a reverse conversion ratio of 1:2, if Vout (corresponding to the input voltage in this example) is 5V, Vin (corresponding to the output voltage) is 2.5V.

Figure 2:
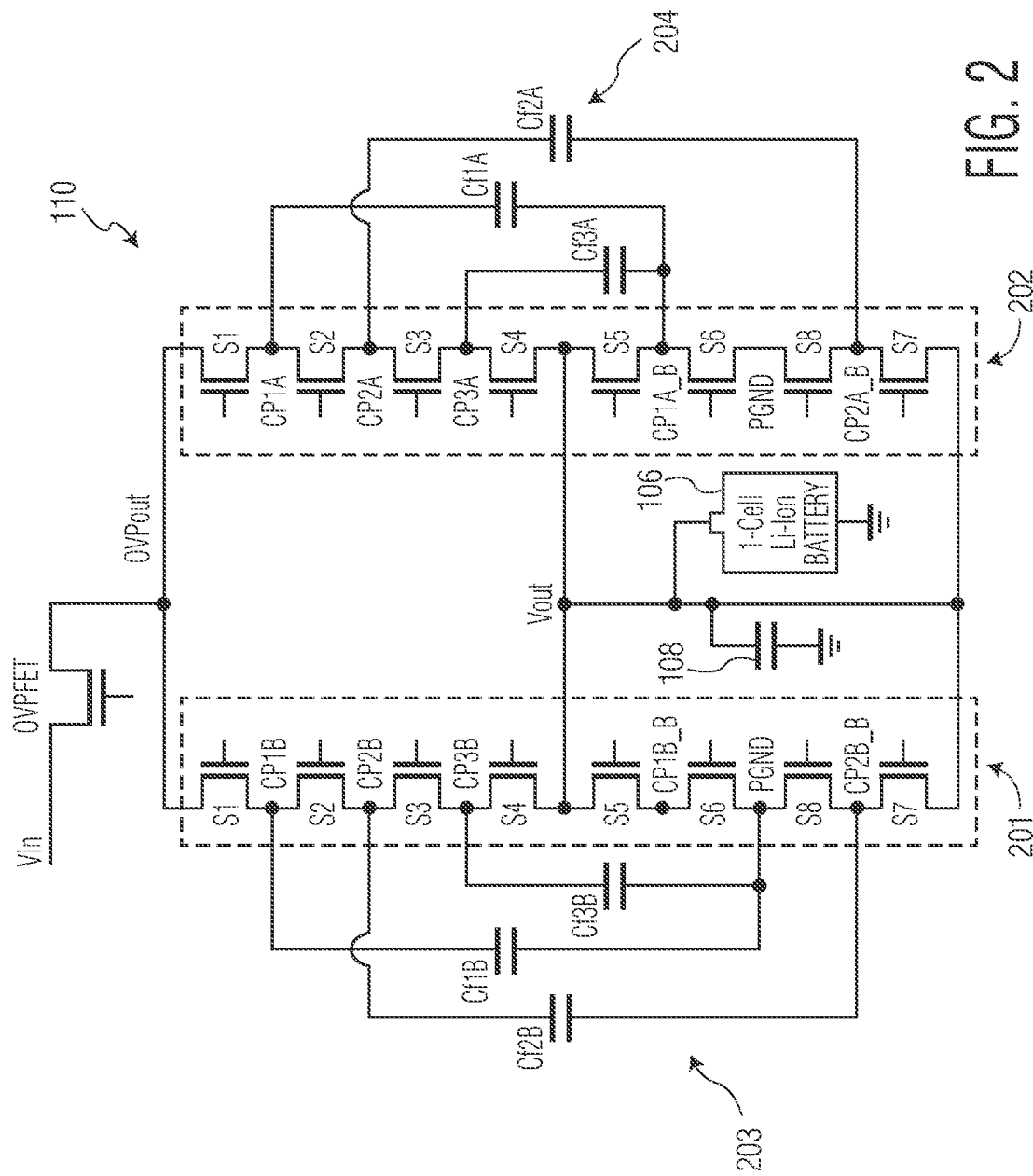
FIG. 2 illustrates, in partial block diagram and partial schematic form, a switched capacitor (SC) power stage with flying capacitors of the smartphone system of FIG. 1, in accordance with one embodiment of the present invention.

Fast charger 122 includes OVPFET, SC power stage 110, and flying capacitors 124. Operation of OVPFET, SC power stage 110, and flying capacitors 124 will be described in reference to FIG. 2. FIG. 2 illustrates OVPFET along with a dual phase SC power stage, including a first power stage 201 with corresponding switches S1-S7 and corresponding flying capacitors 203, including Cf1B, Cf2B, and Cf3B, and a second power stage 202 with corresponding switches S1-S7 and corresponding flying capacitors 204, including Cf1A, Cf2A, and Cf3A. (Note that each switch may simply be referred to as its label, e.g. S1, instead of switch S1.) The first current electrode of OVPFET is coupled to Vin and a second current electrode is coupled to circuit node OVPout which provides an output voltage of the OVPFET. OVPout is coupled to stage 201 and stage 202.

Each of power stages 201 and 202 along with the corresponding flying capacitors are implemented with a Dickson topology, in which each stage includes 9 switches (S0-S8) and 3 flying capacitors (Cf1-Cf3). (Note that OVPFET operates as switch S0, and is shared by power stages 201 and 202.) Each switches S1-S8 can be operated independently of each other. By controlling each of the switches S1-S8 in stage 202 in accordance with a dual phase clock, a desired DC conversion ratio can be achieved between voltages at Vin and Vout. The switches in stage 201 can be operated 180 degrees out of phase with the counterpart switches in stage 202. In this manner, while the flying capacitors of one stage provide power to Vout, the flying capacitors of the other stage are being charged. For example, when switch S1 in stage 202 is closed or on, switch S1 in stage 201 is open or off. In one embodiment, fast charger 122 may only implement a single phase Dickson SC converter with only power stage 202 and flying capacitors 204. The descriptions which follow, starting with FIG. 3, will all be done in reference to stage 202 and flying capacitors 204, but would also apply to stage 201 and flying capacitors 202.

Still referring to stage 202, switches S1-S8 are coupled to OVPout, Vout, and capacitors Cf1A, Cf2A, and Cf3A, in which capacitor 108 and battery 106 are also coupled to Vout. Each of OVPFET and S1-S8 is implemented as a metal-oxide-silicon field effect transistor (MOSFET), in which each of these transistors form a parasitic diode, which may be drawn in the drawings between the first and second current electrode of a transistor (such as, for example, for OVPFET in FIG. 2 or S1-S8 in FIG. 3). In the illustrated embodiments herein, each of switches S1-S8 is implemented as an n-type MOSFET (NMOS), but alternatively, each can be implemented as a p-type MOSFET (PMOS), although NMOS transistors are generally smaller than PMOS transistors. Switches S1-S8 may also be referred to as transistors S1-S8, respectively, or simply as S1-S8, respectively.

A first current electrode of S1 is coupled to OVPout and a second current electrode of S1 is coupled to circuit node CP1A. A first current electrode of S2 is coupled to CP1A and a second current electrode of S2 is coupled to CP2A. A first current electrode of S3 is coupled to CP2A and a second current electrode of S3 is coupled to CP3A. A first current electrode of S4 is coupled to CP3A and a second current electrode of S4 is coupled to Vout. A first current electrode of S5 is coupled to Vout and a second current electrode of S5 is coupled to a circuit node CP1A_B. A first current electrode of S6 is coupled to CP1A_B and a second current electrode of S6 is coupled to PGND. A first current electrode of S8 is coupled to PGND, and a second current electrode of S8 is coupled to CP2A_B. A first current electrode of S7 is coupled to CP2A_B, and a second current electrode of S7 is coupled to Vout. Capacitor Cf1A is coupled between CP1A and CP1A_B. Capacitor Cf2A is coupled between CP2A and CP2A_B. Capacitor Cf3A is coupled between CP3A and CP3A_B. Therefore, note that each of the flying capacitors are switchably coupled to OVPout.

With respect to stage 201, switches S1-S8 are coupled to OVPout, Vout, and capacitors Cf1B, Cf2B, and Cf3B in a manner analogous to stage 202. For example, switches S1-S8 of stage 201, circuit nodes CP1B, CP2B, CP3B, CP1B_B, CP2B_B, and CP3B_B, capacitors Cf1B, Cf2B, and Cf3B are analogous to S1-S7 of stage 201, circuit nodes CP1A, CP2A, CP3A, CP1A_B, CP2A_B, and CP3A_B, capacitors Cf1A, Cf2A, and Cf3A, and are coupled analogously to the elements in stage 202. Also, the descriptions provided above with respect to S1-S8 of stage 202 also apply to S1-S8 of stage 201. Although not illustrated in FIG. 2, the gate of each switch of stages 201 and 202 may be coupled to the output of a corresponding gate driver, which receives a corresponding control signal, as will be described in reference to stage 202 in FIG. 3.

Each switch within a power stage, such as stage 202, can be switched in a particular configuration based on a pair of out-of-phase, non-overlapping clocks to achieve the desired conversion. The non-overlapping clocks can be used to alternately provide a first conversion phase and a second conversion phase. For example, the table below (Table 1), provides examples for a switch configuration during each of a first phase (phase1) and a second phase (phase2) for a power stage to achieve a 2:1 conversion or to achieve a 4:1 conversion.

TABLE 1

| | Switch Configuration | | | Switch Configuration | |
|---|---|---|---|---|---|
| Phase1 | 2:1 | 4:1 | Phase2 | 2:1 | 4:1 |
| S1 | ON | ON | S1 | OFF | OFF |
| S2 | ALWAYS ON | OFF | S2 | ALWAYS ON | ON |
| S3 | ALWAYS ON | ON | S3 | ALWAYS ON | OFF |
| S4 | OFF | OFF | S4 | ON | ON |
| S5 | ON | ON | S5 | OFF | OFF |
| S6 | OFF | OFF | S6 | ON | ON |
| S7 | ON | OFF | S7 | OFF | ON |
| S8 | OFF | ON | S8 | ON | OFF |

For the embodiment of FIG. 2 which implements a dual phase converter, each of stages 201 and 202 would operate according to Table 1 to achieve the desired conversion, but the pair of non-overlapping clocks for each of power stage 201 and power stage 202 would be 180 degrees out of phase with each other. Note that the power stage of an SC converter can have a different number of switches and different configurations to implement a Dickson topology.

Each flying capacitor and each switch of the power stage has a maximum voltage rating, above which the capacitors or switches can be over-stressed, resulting in damage to the devices. To keep the circuits smaller, these components are limited in their voltage ratings. For example, in one embodiment, the Cf1 capacitor is rated to be "1×Vout", Cf2 is rated to be "2×Vout", and Cf3 to be "3×Vout". Also, some of the switches of a power stage may be rated as "1×Vout" while others as "2×Vout". However, in order to use these small voltage rated components, the startup conditions of the fast charger need to be well controlled to make sure that there is no over voltage stress in the power switches and flying capacitors. Therefore, a proper precharge sequence is needed for the flying capacitors in order to protect these components. As will be discussed in reference to FIGS. 3-19, logic signals to the gate drivers of the switches can be controlled to properly turn on or off the switches of the power stage to precharge the flying capacitors and properly start up the SC converter.

While FIG. 2 illustrates a dual phase power stage including power stages 201 and 202, which operate 180 degrees out of phase with each other during normal operation to achieve the desired DCDC conversion ratio, both power stages can be operated at the same time using the same switch control to perform the precharging of all the flying capacitors (Cf1A-Cf3A and Cf1B-Cf3B). Therefore, while the descriptions of FIGS. 3-19 below will focus on power stage 202 and flying capacitors 204 as an example, power stage 201 and flying capacitors 203 can be precharged in the same manner, and at the same time (since both are coupled to OVPout).

Figure 3:
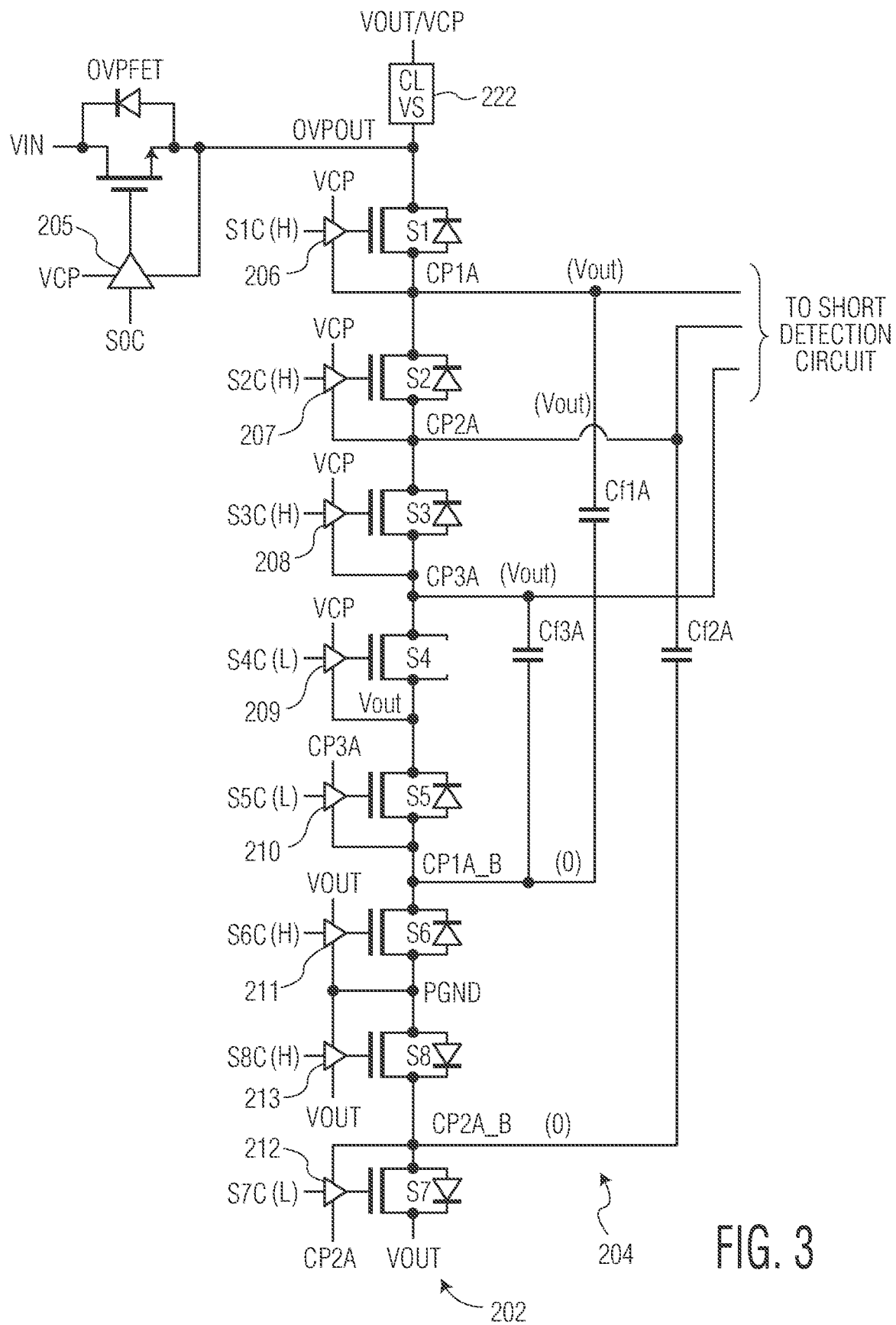
FIG. 3 illustrates, in partial block diagram and partial schematic form, a portion of the fast charger of FIG. 1 in accordance with one embodiment of the present invention.

FIG. 3 illustrates a portion of fast charger 122, including the OVPFET, power stage 202, flying capacitors 204, and a current limited voltage source CLVS 222. Note that the parasitic diodes are drawn in for each of OVPFET and S1-S8. The illustrated embodiment of FIG. 3 also includes gate drivers 205-213 coupled to receive switch control signals S0C-S8C, respectively, from SC control circuit 120. Gate driver 205 has an output coupled to the gate of the OVPFET. Power terminals of gate driver 205 are coupled between an internal voltage supply node (VCP) and OVPout. In one embodiment, VCP provides a voltage generated by an on-chip charge pump. Gate drivers 206-213 each has an output coupled to the gates of switches S1-S8, respectively. Power terminals of gate driver 206 are coupled between VCP and CP1A, power terminals of gate driver 207 are coupled between VCP and CP2A, power terminals of gate driver 208 are coupled between VCP and CP3A, power terminals of gate driver 209 are coupled between VCP and Vout, power terminals of gate driver 210 are coupled between CP3A and CP1A_B, power terminals of gate driver 211 are coupled between Vout and a ground node (e.g. PGND), power terminals of gate driver 213 are coupled between PGND and Vout, and power terminals of gate driver 212 are coupled between CP2A_B and CP2A. Each of nodes CP1A, CP2A, and CP3A are also coupled to short detection circuit 118.

CLVS 222 is powered by Vout or VCP, and is coupled to OVPout and the first current electrode of S1. Any known implementation of a CLVS may be used. For example, CLVS 222 may be implemented with an low dropout regulator (LDO) with a current limiting function, a current limiting resistor divider, a current limiting resistor coupled to a source-follower configured transistor, a current mirror with feedback voltage regulation, or a current mirror with a feedback voltage hysteresis comparator. That is, any circuit implementation may be used to realize a current limited voltage source. However, note that for the precharge operation for power stage 202 which will be described in reference to FIG. 4, only a single CLVS is needed. (If power stage 201 were also being precharged, the first current electrode of the S1 of stage 201 would also be coupled to OVPout.)

Figure 4:
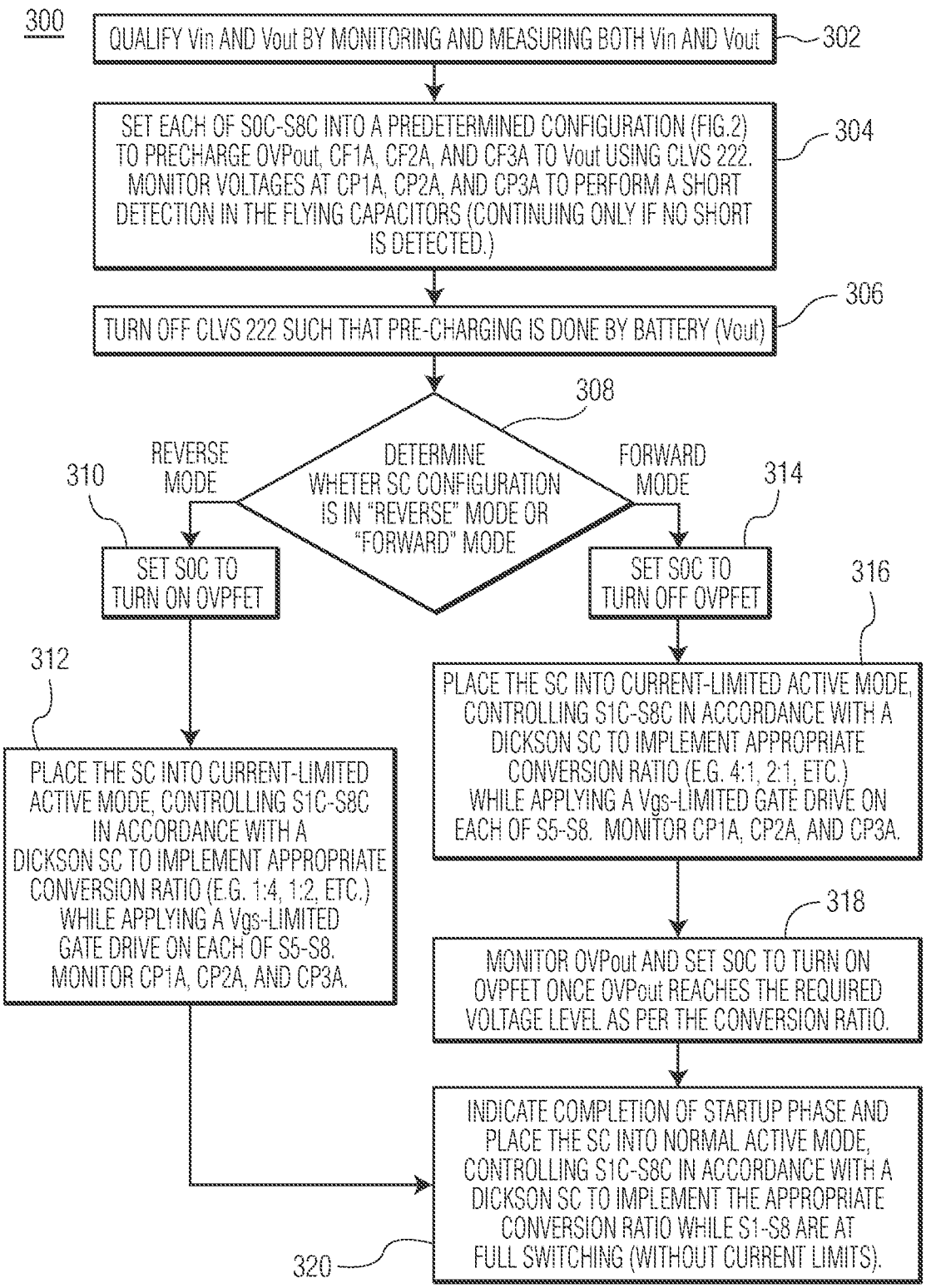
FIG. 4 illustrates, flow diagram form, a method of precharging the fast charger of FIG. 1 in accordance with the embodiment of FIG. 3.

FIG. 4 illustrates, in flow diagram form, a method 300 of precharging the flying capacitors for the embodiment illustrated in FIG. 3. Note that in FIG. 3 (and all the following circuit diagrams) the labels in parentheses for various nodes or signals correspond to particular voltage values used as examples in which, for example, an "H" corresponds to a logic level high voltage value or logic level one and "L" corresponds to a logic level low voltage value or logic level zero. Method 300 corresponds to a unified startup method for the SC converter of fast charger 122 with multiple conversion ratios, as implemented with power stage 202. Also, note that the precharge method of FIGS. 3 and 4 only require a single CLVS, e.g. CLVS 222, to charge up each of the flying capacitors (e.g. flying capacitors 204 including Cf1A, Cf2A, and Cf3A). For this unified method, regardless of whether the configuration of fast charger 122 is in forward mode or reverse mode, the voltage at Vout (corresponding to the battery voltage of battery 106) is used to charge each of the flying capacitors, OVPout, and Vin to Vout. Also, note that the backgate of S4 is kept to ground, and since the precharging is done using Vout, CLVS 222 is also powered by Vout (i.e. battery 106).

Method 300 begins with block 302 in which Vin and Vout are both qualified by monitoring and measuring both Vin and Vout, such as by voltage monitoring circuit 116 in fast charger 122. Qualifying Vin and Vout refers to monitoring/ measuring Vin and Vout to respective reference values to determine if the voltage values of Vin and Vout, respectively, are as expected (as per the reference values). For example, if forward mode 4:1 is selected, then Vin and Vout should be in a ratio of 4:1. Therefore, Vin is monitored and measured to verify that it is indeed four times larger than Vout, in which Vout is also measured in the process. After the qualifying, each of the control signals S0C-S8C is set to provide a predetermined configuration of power stage 202 (as illustrated in FIG. 3) in which a logic level high is provided to gate drivers 206, 207, 208, 211, and 213 so as to turn on S1, S2, S3, S6, and S8, and a logic level low is provided to gate drivers 205, 209, 210, and 212 so as to turn off OVPFET (S0), S4, S5, and S7. With this predetermined configuration, nodes CP2A_B and CP1A_B are at PGND (e.g. 0 V), and CLVS 222 (powered by Vout) is used to charge OVPout, CP1A, CP2A, and CP3A (all connected via closed switches S1-S3) to Vout.

While CP1A, CP2A, and CP3A are being precharged to Vout, these nodes are monitored by short detection circuit 118 to determine if there is a short in any of the fly capacitors 204. If any of these nodes cannot be precharged to Vout, then a short is indicated on one of Cf1A, Cf2A, or Cf3A. In one embodiment, short detection circuit 118 only indicates if a short is detected but cannot indicate which particular fly capacitor is shorted. Method 300 only continues if no short is detected.

Assuming no short is detected, method 300 continues to block 306 in which CLVS 222 is turned off such that the remaining precharging is done by the battery (Vout) without CLVS 222. At decision diamond 308, it is determined whether the SC converter configuration (which can be provided, for example, by SC control 120) is in reverse mode (e.g. 1:4, 1:2, etc.) or forward mode (e.g. 4:1, 2:1, etc.). If in reverse mode, then at block 310, S0C is set to a logic level high to turn on OVPFET so as to properly precharge Vin. With OVPFET on, method 300 proceeds to block 312 in which the switched capacitor (SC) of fast charger 122 (e.g. power stage 202) is placed into current-limited active mode. During this current-limited active mode, S1C-S8C are controlled in accordance with a Dickson SC converter to implement the appropriate ratio (e.g. 1:4, 1:2, etc.) while applying a gate-to-source voltage (Vgs) limited gate drive on each of S5-S8. For example, each of gate drivers 210-213 is set to operate in a Vgs-limited mode while controlling S5-S8. With the Vgs-limited mode of operation, the Vgs of these switches is clamped to achieve a higher ON resistance to limit the inrush current from the battery. While power stage 202 is operating in this current-limited active mode, Cf1A, Cf2A, and Cf3A are still monitored by short detection circuit 118 to determine if there are any shorts in fly capacitors 204. With the SC operating to implement the appropriate conversion ratio, voltage monitoring circuit 116 continues to monitor Vin and Vout to determine when the appropriate conversion ratio has been reached. For example, for a 1:4 conversion ratio, if Vout is 5V, then Vin should be 1.25V.

Once the appropriate conversion ratio is reached, in block 320, completion of the startup phase is indicated to SC control 120, and the SC converter of fast charger 122 can be placed into normal active mode in which S1C-S8C are controlled in accordance with a Dickson SC converter to implement the appropriate conversion ratio. In normal active mode, S5-S8 are in full switching mode and are no longer operated with current limits (i.e. gate drivers 210-213 are no longer operating in a Vgs-limited mode such that they operate with full switching).

If, at decision diamond 308, it is determined that the SC configuration is "forward mode", then at block 314, S0C is set to a logic level low so as to turn off OVPFET. Method 300 then proceeds to block 316 which operates the same as block 312, described above. That is, the SC operates in accordance with a Dickson SC converter to implement the appropriate conversion ratio while each of drivers 210-213 operate in a Vgs-limited mode to control S5-S8. Again, CP1A, CP2A, and CP3A are continuously monitored to detect any shorts.

After block 316, method 300 proceeds to block 318 in which OVPout is monitored such that upon OVPout reaching the required voltage level per the conversion ratio, S0C is set to a logic level high to turn on OVPFET. For example, for a 4:1 conversion ratio, if OVPout is 20V, Vout should be 5V. With OVPFET turned on, Vin=OVPout. Afterwards, method 300 proceeds to block 320, indicating completion of the startup phase in which the SC converter of fast charger 122 can be placed into normal active mode.

Note that, in one embodiment, prior to blocks 312 and 316, the backgate of S4 is switched from being connected to ground to being connected to its source. Also, note that nodes CP1, CP2, and CP3 (in power stages 202 and 201) can be continuously monitored during the precharge and startup schemed of FIG. 4 to determine if there are any shorts in the fly capacitors. As can be seen with method 300, regardless of whether the SC converter is configured in forward or reverse mode, both use Vout (i.e. the battery 106) to charge up OVPout (in which OVPFET is either on or off, depending on whether the SC is in reverse or forward mode, respectively).

With method 300, a very similar precharge and startup sequence is used regardless of the configuration, which simplifies the circuit design. Also, with this method, there is no need to precharge the flying capacitors to different voltage levels. That is, they are each precharged to Vout. Also, due to building up the voltages from low to high using Vgs limited drivers, there is less concern for voltage over-stress on any of the switches or capacitors.

Figure 7:
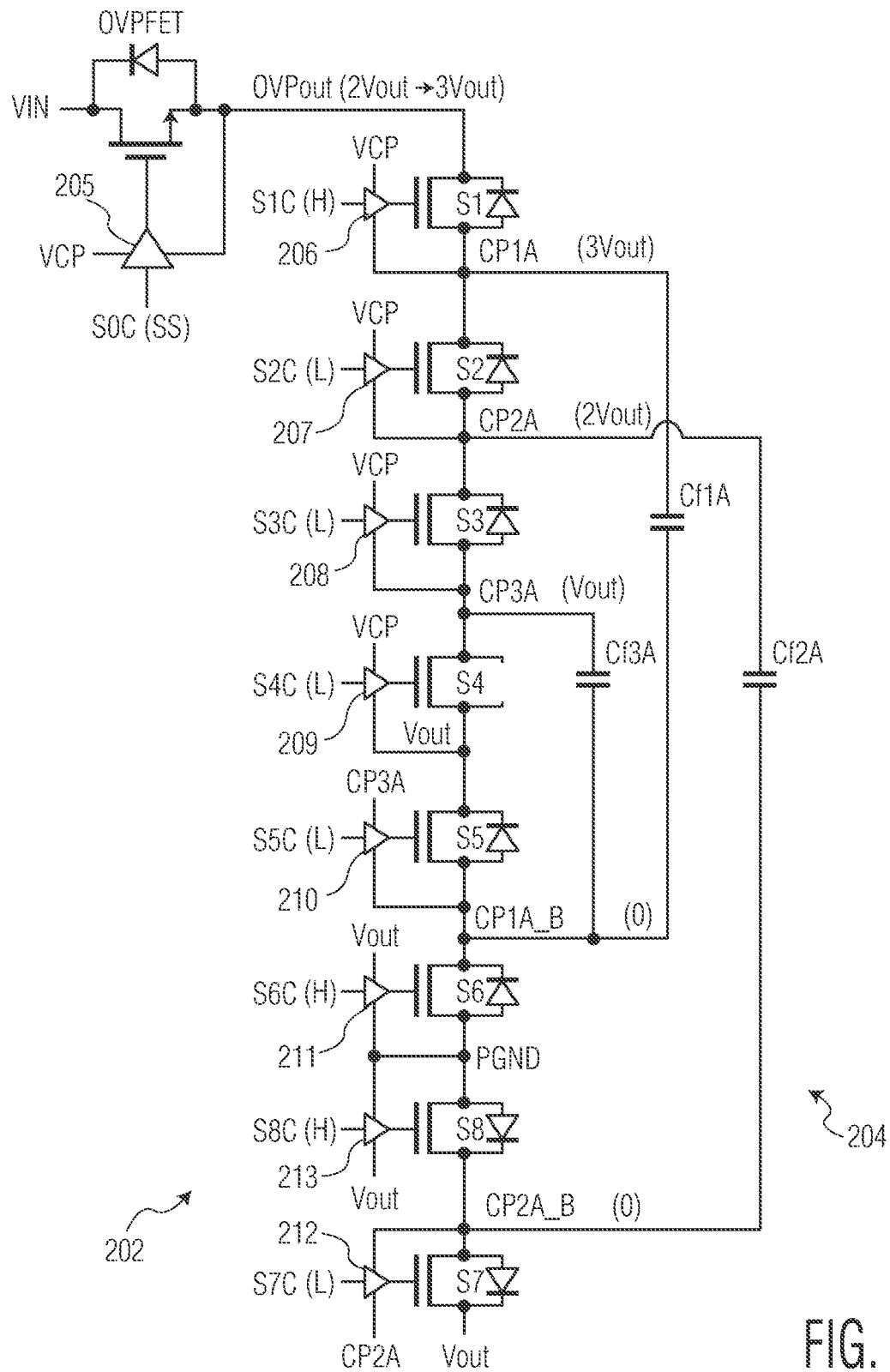
Figure 8:
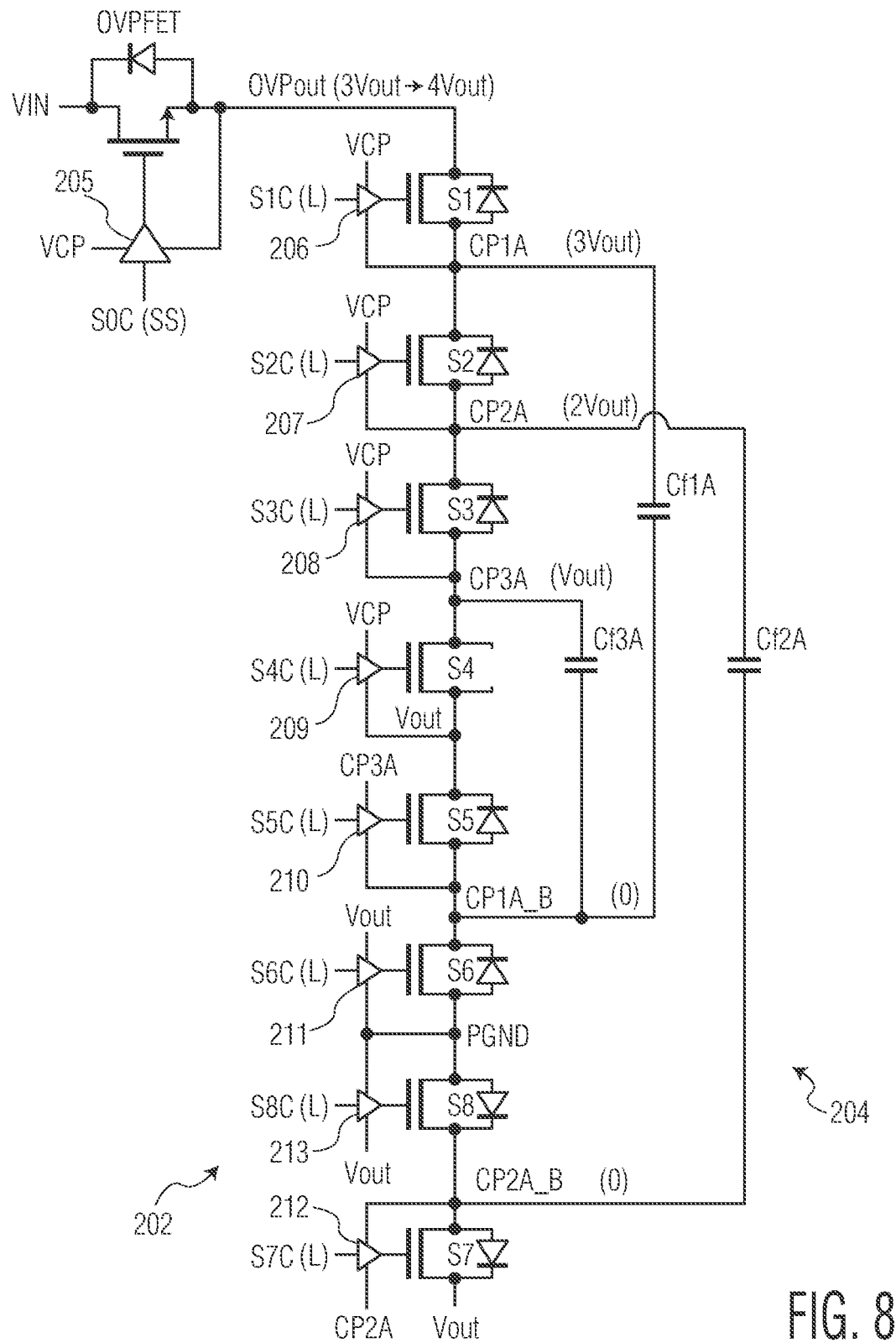
Figure 9:
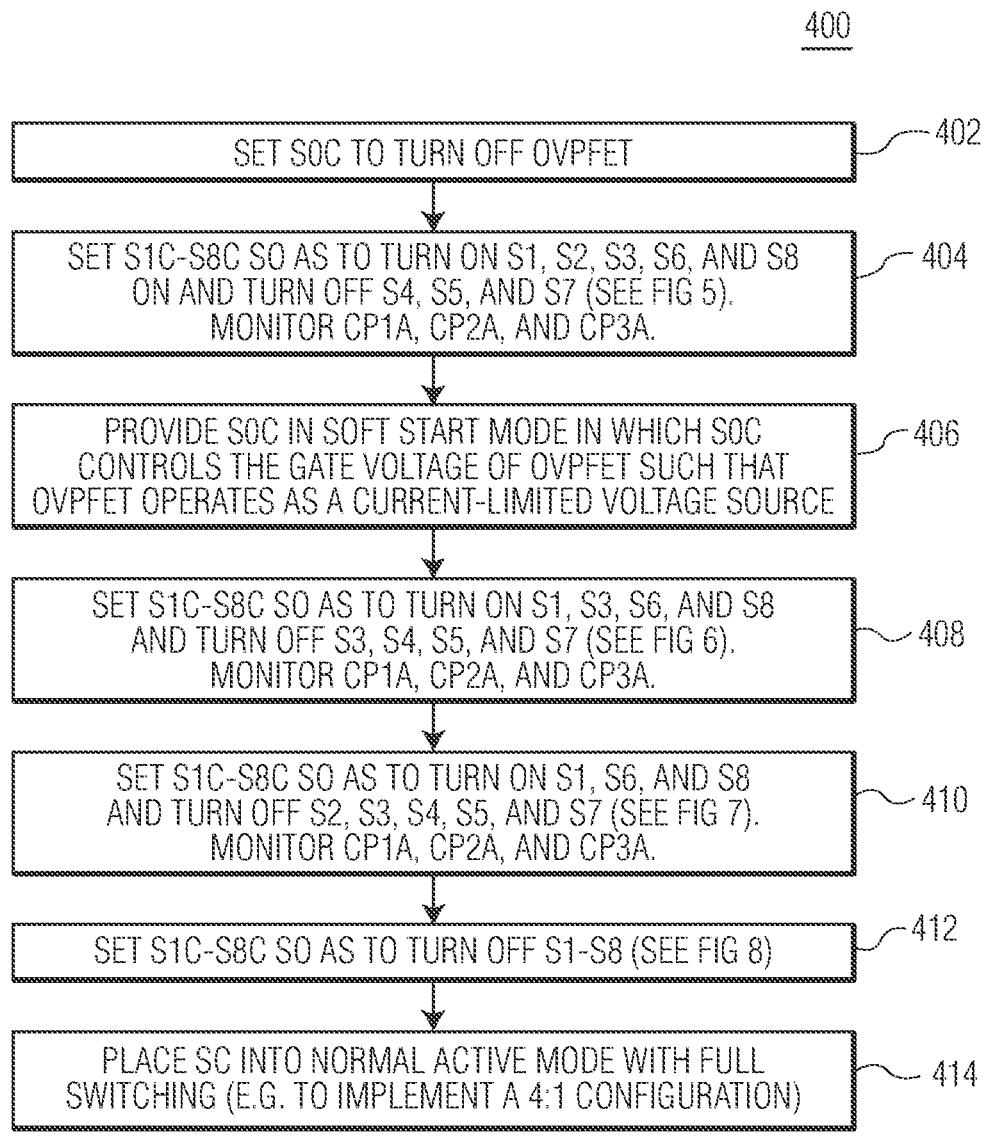
FIG. 9 illustrates, in flow diagram form, a precharge method in accordance with the embodiment of FIGS. 5-8.

FIGS. 5-9 correspond to a precharging scheme for the SC converter of fast charger 122 (which is configured to provide a forward conversion ratio of 4:1) in which the OVPFET is reused as the CLVS. FIG. 9 illustrates, in flow diagram form, a method 400 for precharging each of OVPout, CP1A, CP2A, and CP3A in accordance with one embodiment of the present invention. Each of FIGS. 5-8 illustrates the same portion of fast charger 122 as was illustrated in FIG. 3, with the exception of CLVS 222 (which is not needed in the FIGS. 5-8). Therefore the description of FIG. 3 also applies to the elements in FIGS. 5-8 that are common with FIG. 3. However, note that the values in parentheses for various nodes or signals may be different since they correspond to the precharging example of method 400. Also, note that each of FIGS. 5-8 corresponds to a snapshot of the circuitry taken at four incremental steps in time, as will be described in reference to the flow diagram of FIG. 9.

Figure 5:
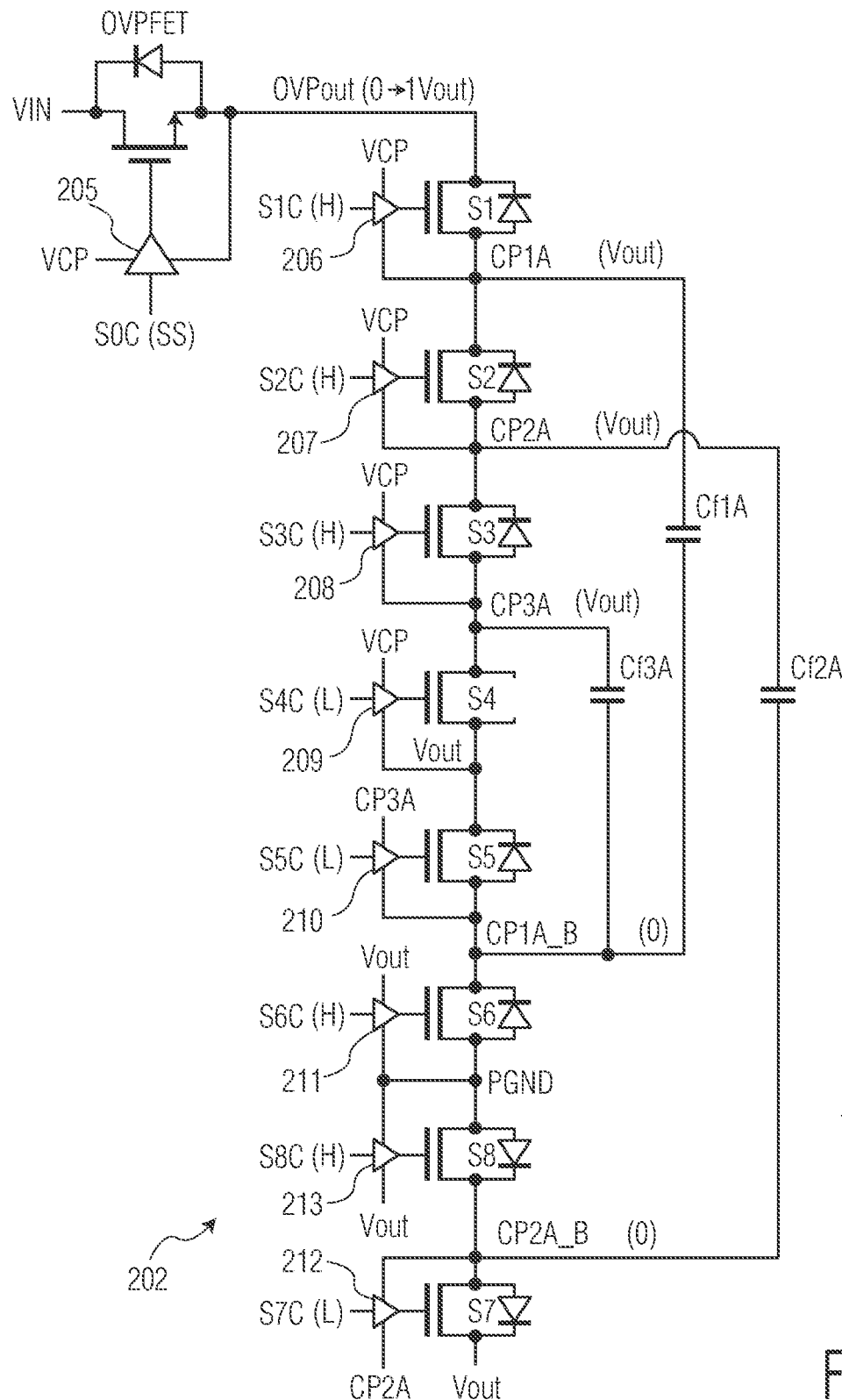
FIGS. 5-8 illustrate, in partial block diagram and partial schematic form, a portion of the fast charger of FIG. 1 at different times during a precharge method, in accordance with one embodiment of the present invention.

Referring to FIG. 9, method 400 begins with block 402 in which S0C is set to a logic level low to turn off OVPFET. Next, in block 404, S1C-S8C are each set so as to turn on switches S1, S2, S3, and S8 and turn off S4, S5, and S7. This is illustrated in FIG. 5 with the values of S1C-S8C being HHHLLHLH, respectively. In this manner, nodes CP1A_B and CP2A_B are at PGND (0V), while nodes CP1A, CP2A, and CP3A are each precharged to Vout. As in method 300, note that CP1A, CP2A, and CP3A are continuously monitored during precharge for short detection.

Figure 6:
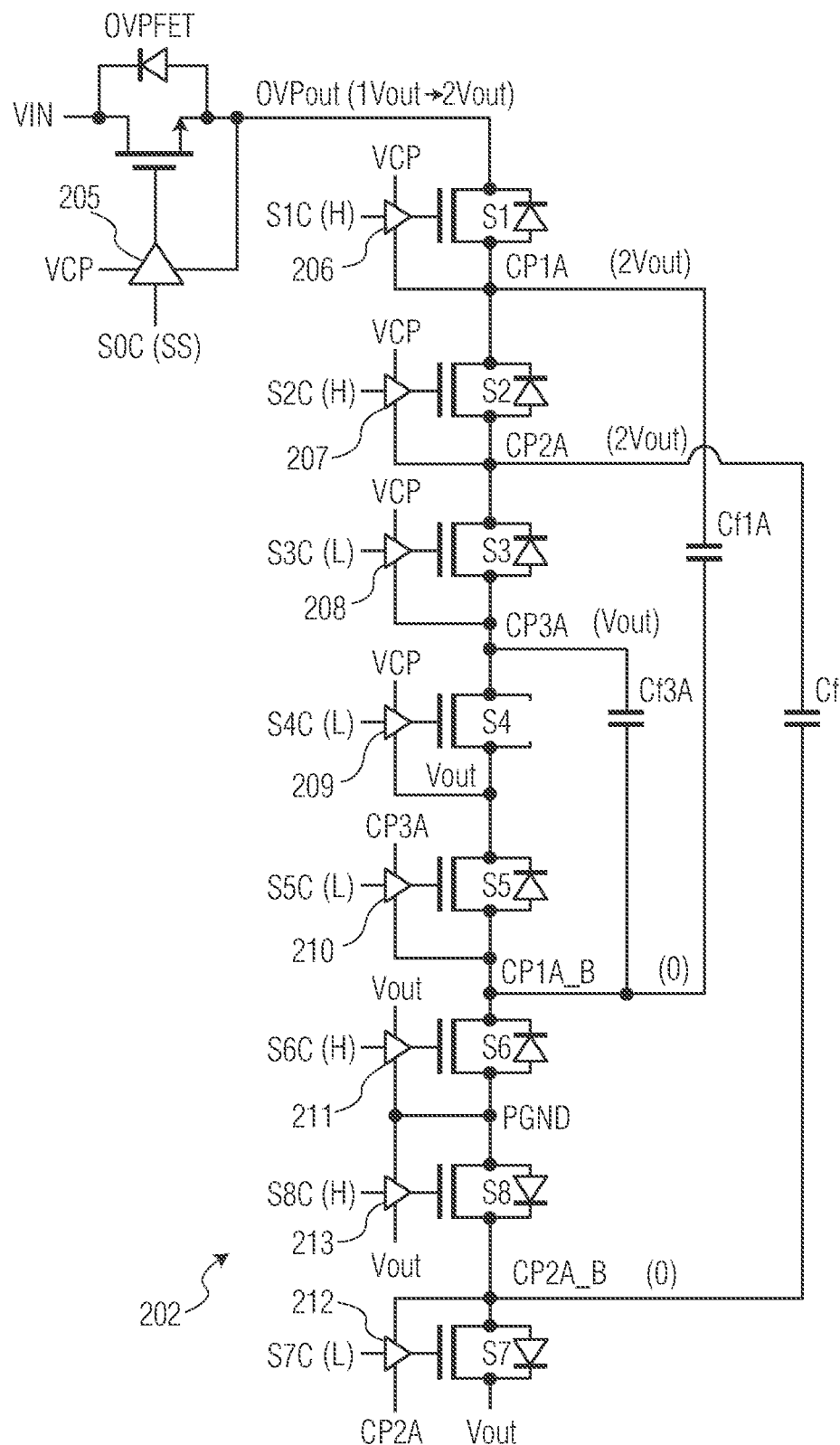

With each of Cf1A-Cf3A charged to Vout, in block 406, S0C is set to a soft start (SS) mode in which voltage level of S0C, via driver 205, controls the gate voltage of OVPFET such that the OVPFET operates as a CLVS. In block 408, S1C-S8C are set so as to turn on S1, S3, S6, and S8, and turn off S3, S4, S5, and S7. This is illustrated in FIG. 6 with the values of S1C-S8C being HHLLLHLH, respectively. In this manner, nodes CP1A and CP2A (and thus Cf1A and Cf2A) are each precharged to "2×Vout", while CP3A remains at Vout. OVPout is also now precharged from Vout to "2×Vout". Nodes CP1A, CP2A, and CP3A are monitored for short detection.

Next, in block 410, with OVPFET continuing to operate as a CLVS, S1C-S8C are set so as to turn on S1, S6, and S8, and turn off S2, S3, S4, S5, and S7. This is illustrated in FIG. 7 with the values of S1C-S8C being HLLLLHLH, respectively. In this manner, node CP1A (and thus Cf1A) is precharged to "3×Vout", while CP2A remains at "2×Vout", and CP3A remains at Vout. OVPout is also now precharged from "2×Vout" to "3×Vout". Nodes CP1A, CP2A, and CP3A are monitored for short detection.

Next, in block 412, with OVPFET continuing to operation as a CLVS, S1C-S8C are set to turn off each of S1-S8. This is illustrated in FIG. 8 with the values of S1C-S8C being all L. In this manner, OVPFET continues precharging to "4×Vout", while CP1A remains at "3×Vout", CP2A remains at "2×Vout", and CP1A remains at Vout. After the precharging of blocks 404-412 to gradually charge the flying capacitors and OVPout to the appropriate values for a 4:1 conversion, in block 414, the SC converter of fast charger 122 can be placed into normal active mode with full switching, in which S0C is set so as to turn on OVPFET and each of S1C-S8C is controlled in accordance with the Dickson topology to implement the 4:1 ratio.

Figure 12:
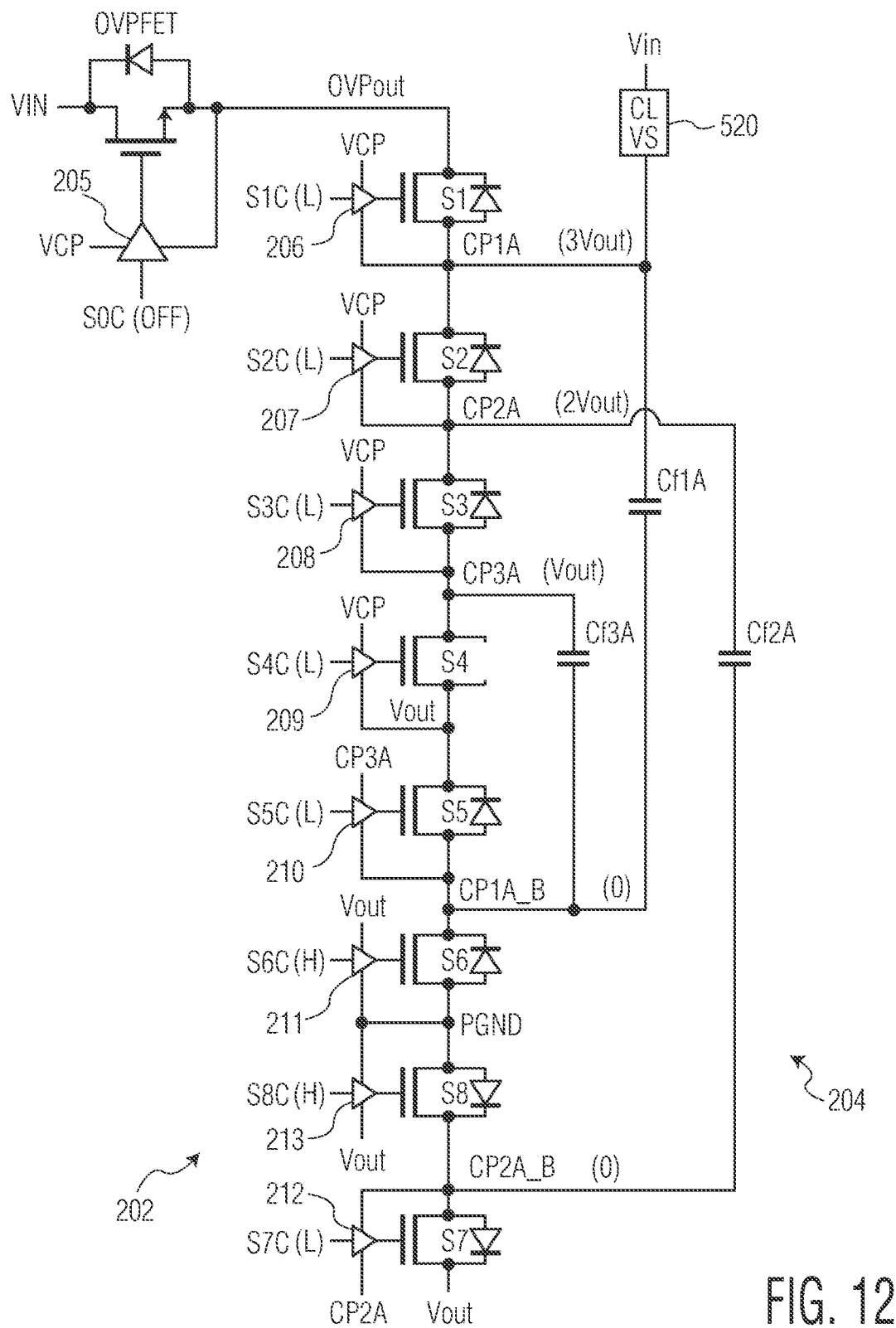
Figure 13:
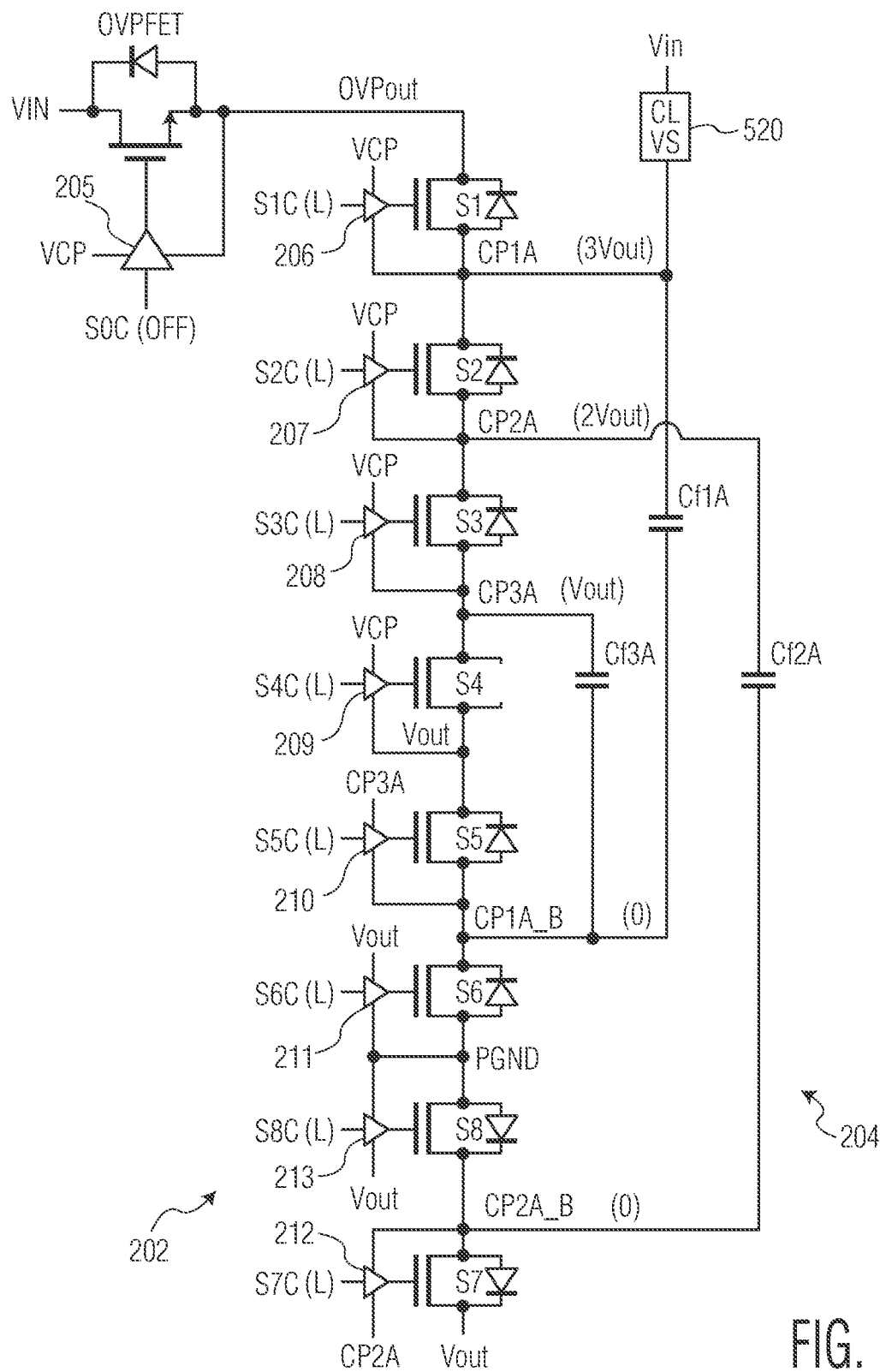
Figure 14:
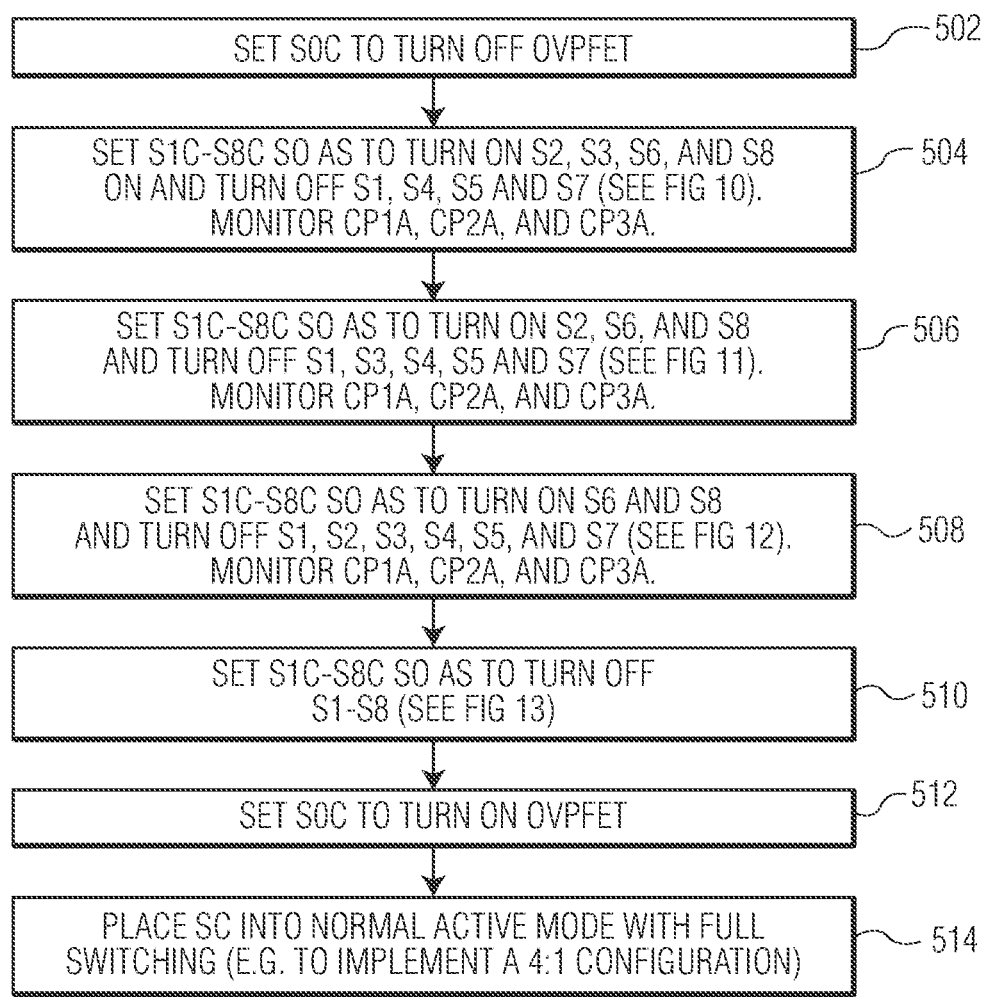
FIG. 14 illustrates, in flow diagram form, a precharge method in accordance with the embodiment of FIGS. 10-13.

While in FIGS. 5-9, the OVPFET is used as a CLVS, in an alternate embodiment, a separate CLVS, powered by Vin and coupled to CP1A, is used for precharging, as illustrated in FIGS. 10-13 and described in the flow diagram of FIG. 14. FIG. 14 illustrates, in flow diagram form, a method 500 for precharging each of OVPout, CP1A, CP2A, and CP3A in accordance with one embodiment of the present invention. Each of FIGS. 10-13 illustrates the same portion of fast charger 122 as was illustrated in FIG. 3, with the exception of CLVS 222 (in which, instead, a CLVS 520 powered by Vin and coupled to CP1A is used). Therefore the description of FIG. 3 also applies to the elements in FIGS. 10-13 that are common with FIG. 3. However, note that the values in parentheses for various nodes or signals may be different since they correspond to the precharging example of method 500. Also, note that each of FIGS. 10-13 corresponds to a snapshot of the circuitry taken at four incremental steps in time, as will be described in reference to the flow diagram of FIG. 14.

Figure 10:
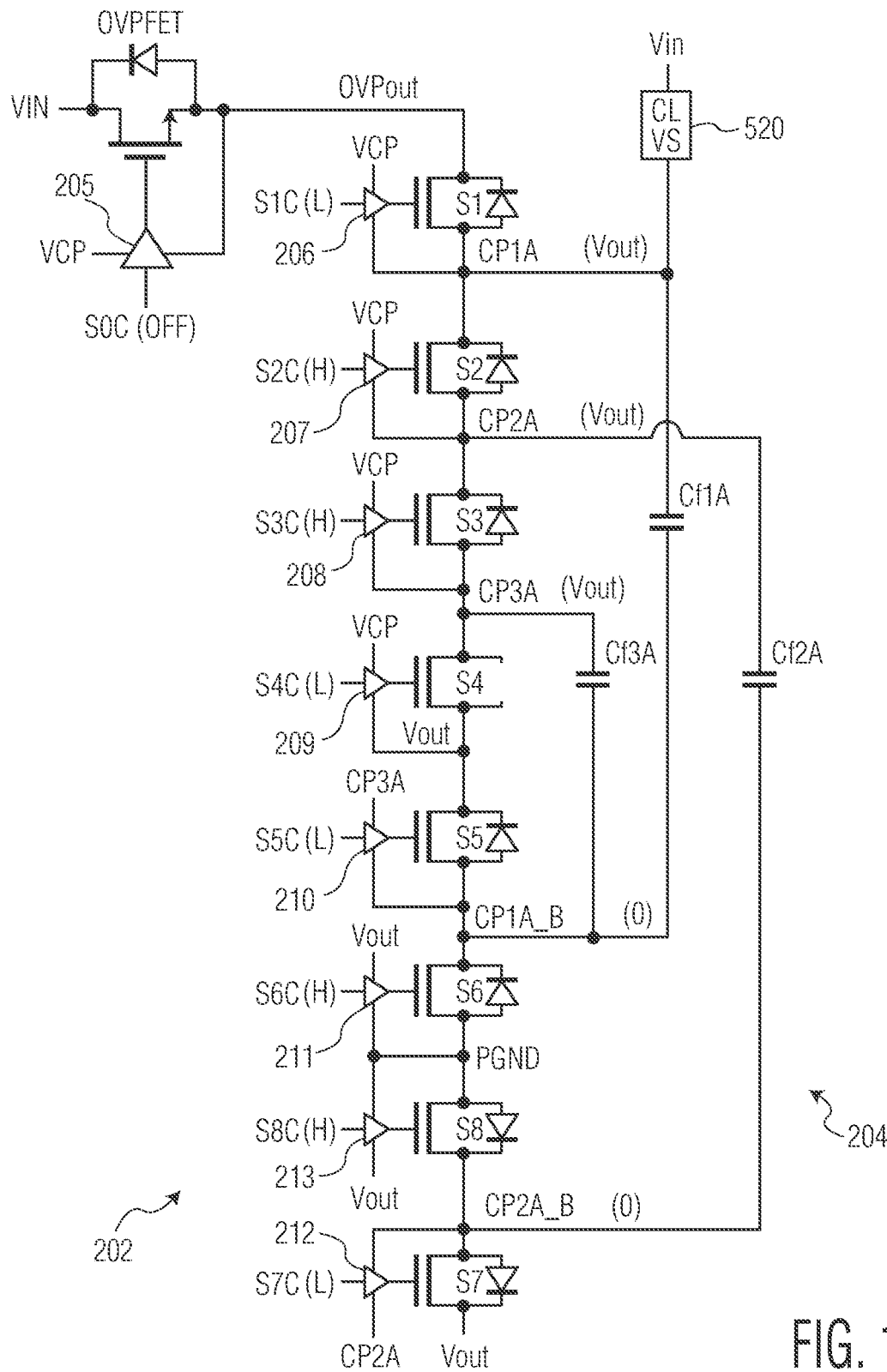
FIGS. 10-13 illustrates, in partial block diagram and partial schematic form, a portion of the fast charger of FIG. 1 at different times during a precharge method, in accordance with one embodiment of the present invention.

In the embodiment of FIG. 14, while OVPout is also getting charged, it is not charged explicitly, due to the location of CLVS 520 (which is not coupled to provide current directly to OVPout but to node CP1A). As will be seen in FIGS. 10-13, OVPout is charged after flying caps Cf1A-Cf3A are charged. FIG. 14 begins with block 502 in which S0C is set to a logic level low to turn off OVPFET. Next, in block 504, S1C-S8C are each set so as to turn on switches S2, S3, S6, and S8 and turn off S1, S4, S5, and S7. This is illustrated in FIG. 10 with the values of S1C-S8C being LHHLLHLH, respectively. In this manner, nodes CP1A_B and CP2A_B are at PGND (0V), while nodes CP1A, CP2A, and CP3A are each precharged to Vout. As in methods 300 and 400, note that CP1A, CP2A, and CP3A are continuously monitored during precharge for short detection.

Figure 11:
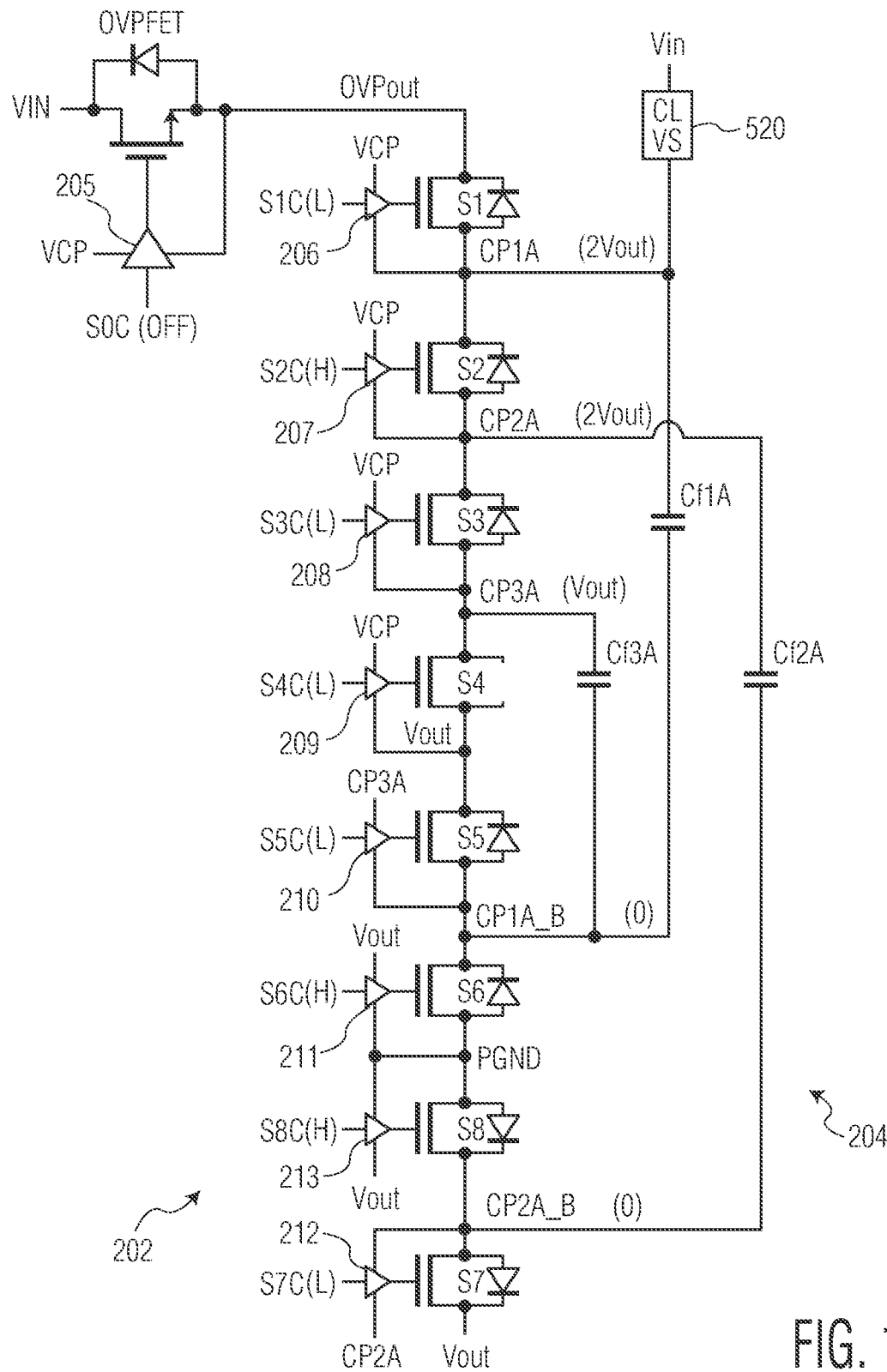

With each of Cf1A-Cf3A charged to Vout, in block 506, S1C-S8C are set so as to turn on S2, S6, and S8, and turn off S1, S3, S4, S5, and S7. This is illustrated in FIG. 11 with the values of S1C-S8C being LHLLLHLH, respectively. In this manner, nodes CP1A and CP2A (and thus Cf1A and Cf2A) are each precharged in parallel to "2×Vout", while CP3A remains at Vout. OVPout is not yet precharged since S1 remains off, disconnecting OVPout from CP1A. Nodes CP1A, CP2A, and CP3A are monitored for short detection.

Next, in block 508, S1C-S8C are set so as to turn on S6 and S8, and turn off S1, S2, S3, S4, S5, and S7. This is illustrated in FIG. 12 with the values of S1C-S8C being LLLLLHLH, respectively. In this manner, node CP1A (and thus Cf1A) is precharged to "3×Vout", while CP2A remains at "2×Vout" and CP3A remains at Vout. OVPout is not charged. Nodes CP1A, CP2A, and CP3A are monitored for short detection.

Next, in block 510, S1C-S8C are set to turn off each of S1-S8. This is illustrated in FIG. 13 with the values of S1C-S8C being all L. Next, in block 512, S0C is set so as to turn on OVPFET, which results in OVPout being charged to "Vin-Vdiode" (in which Vdiode is the voltage across the parasitic body diode of OVPFET). CP1A remains at "3×Vout", CP2A remains at "2×Vout", and CP1A remains at Vout. After the precharging of blocks 504-512 to gradually charge the flying capacitors to the appropriate values for a 4:1 conversion, in block 514, the SC converter of fast charger 122 is placed into normal active mode with full switching, in which OVPFET is on and each of S1C-S8C are controlled in accordance with a Dickson topology to implement the 4:1 ratio.

Figure 17:
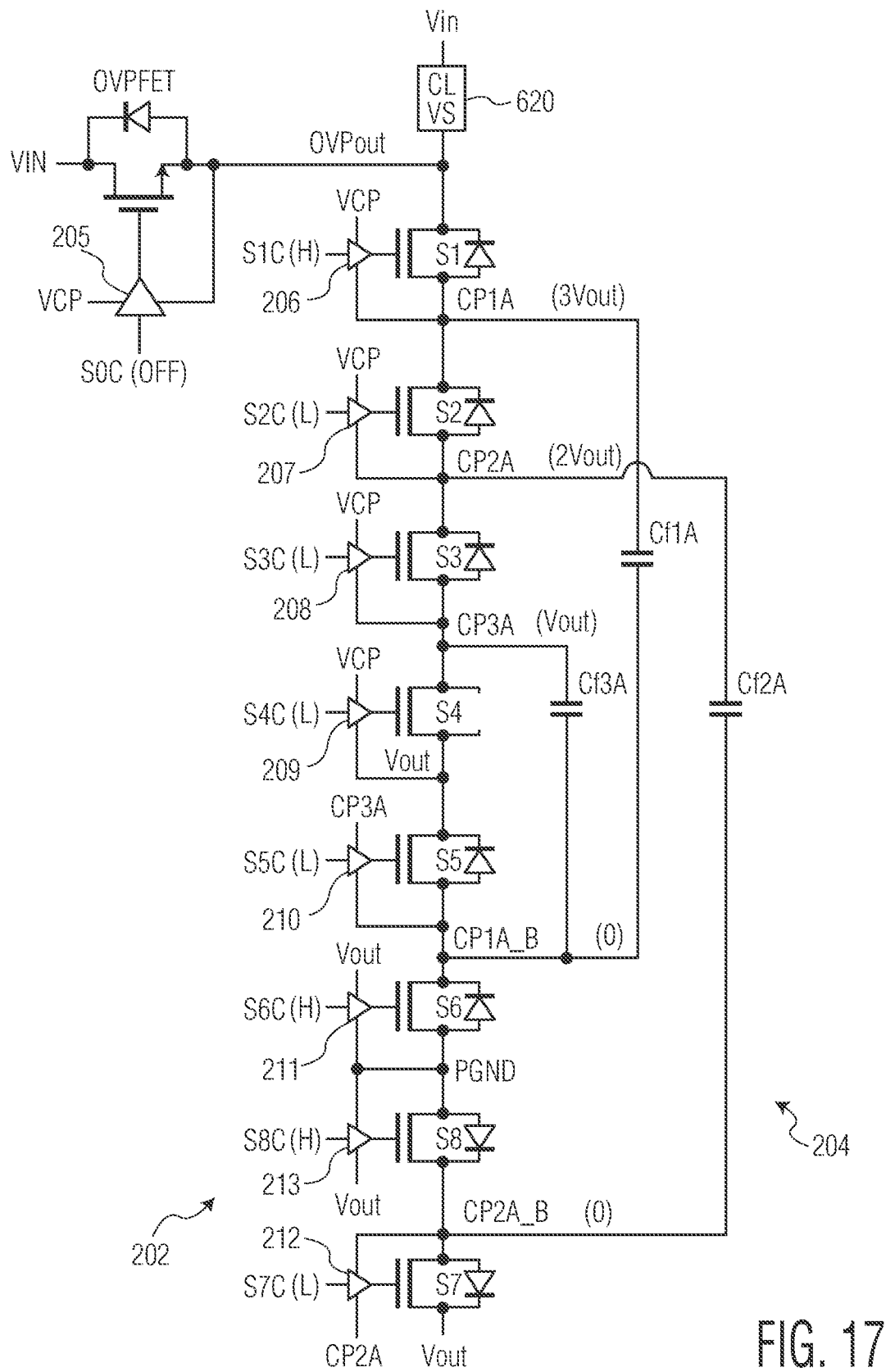
Figure 18:
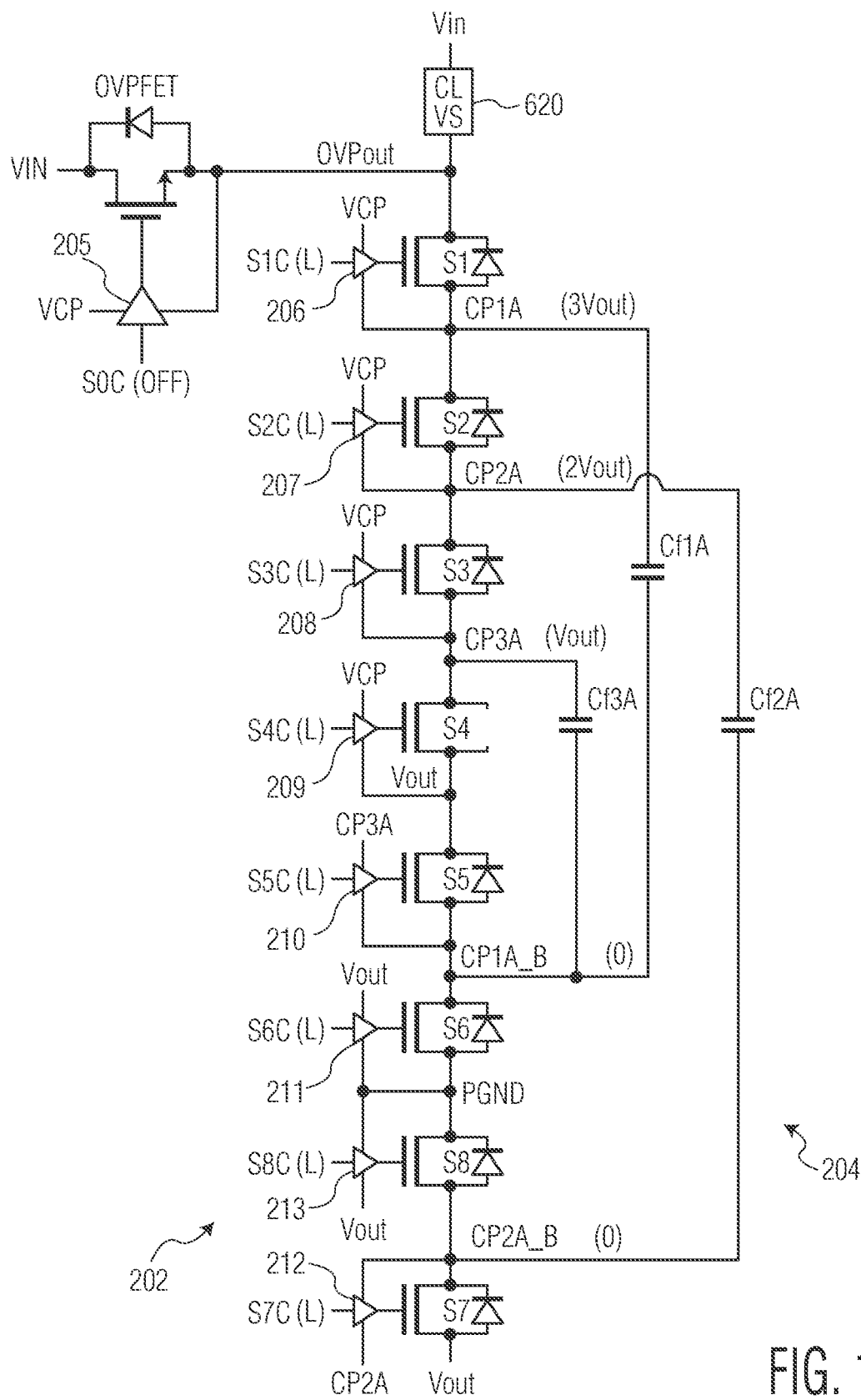
Figure 19:
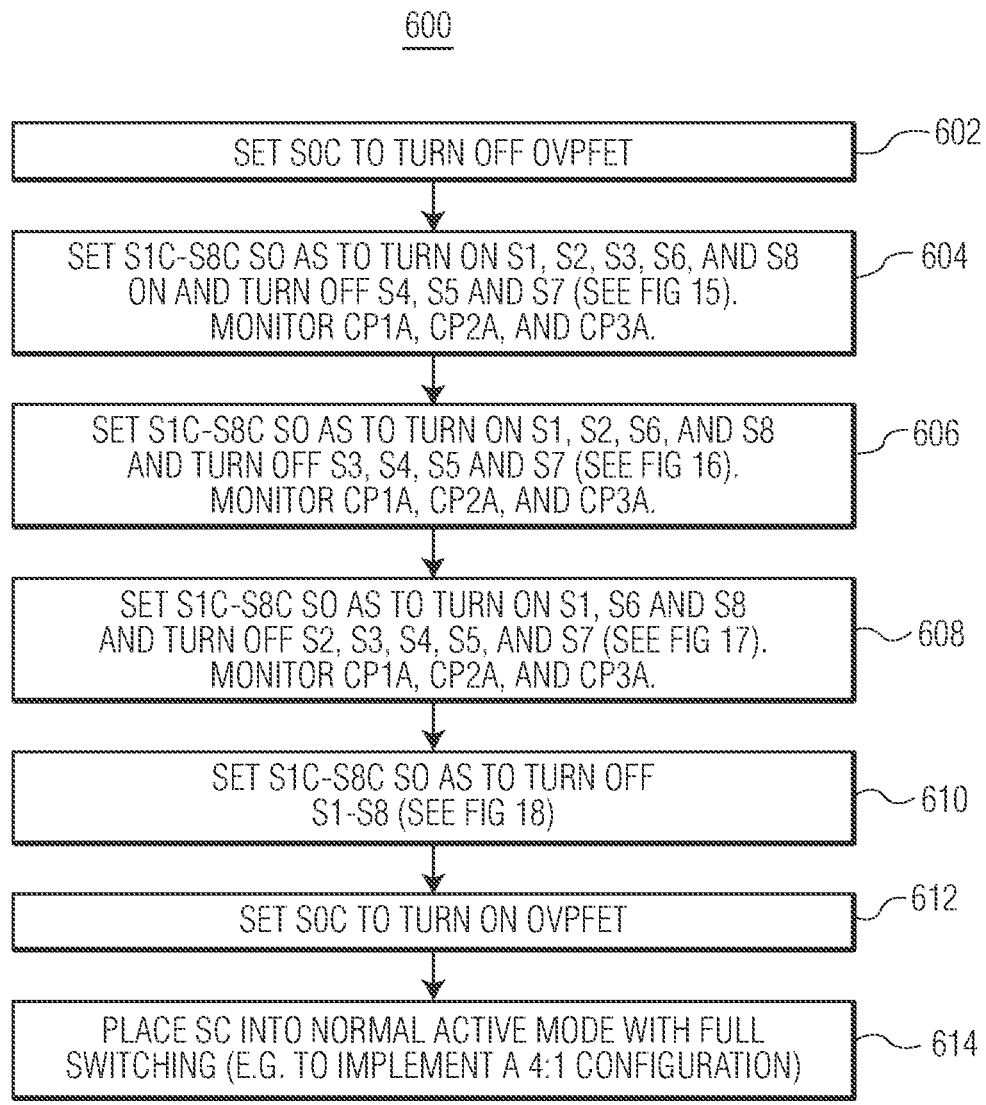
FIG. 19 illustrates, in flow diagram form, a precharge method in accordance with the embodiment of FIGS. 15-18.

FIGS. 15-18 illustrate an embodiment which also uses a separate CLVS which is powered by Vin, but is coupled to the OVPout node rather than C1A_B. This will allow for the precharging of OVPout to "4×Vout", as will be described with the flow diagram of FIG. 19. FIG. 19 illustrates, in flow diagram form, a method 600 for precharging each of OVPout, CP1A, CP2A, and CP3A in accordance with one embodiment of the present invention. Each of FIGS. 15-18 illustrates the same portion of fast charger 122 as was illustrated in FIG. 3, with the exception of CLVS 222 (in which, instead, a CLVS 620 powered by Vin and coupled to OVPout is used). Therefore the description of FIG. 3 also applies to the elements in FIGS. 10-13 that are common with FIG. 3. However, note that the values in parentheses for various nodes or signals may be different since they correspond to the precharging example of method 600. Also, note that each of FIGS. 15-18 corresponds to a snapshot of the circuitry taken at four incremental steps in time, as will be described in reference to the flow diagram of FIG. 19.

Figure 15:
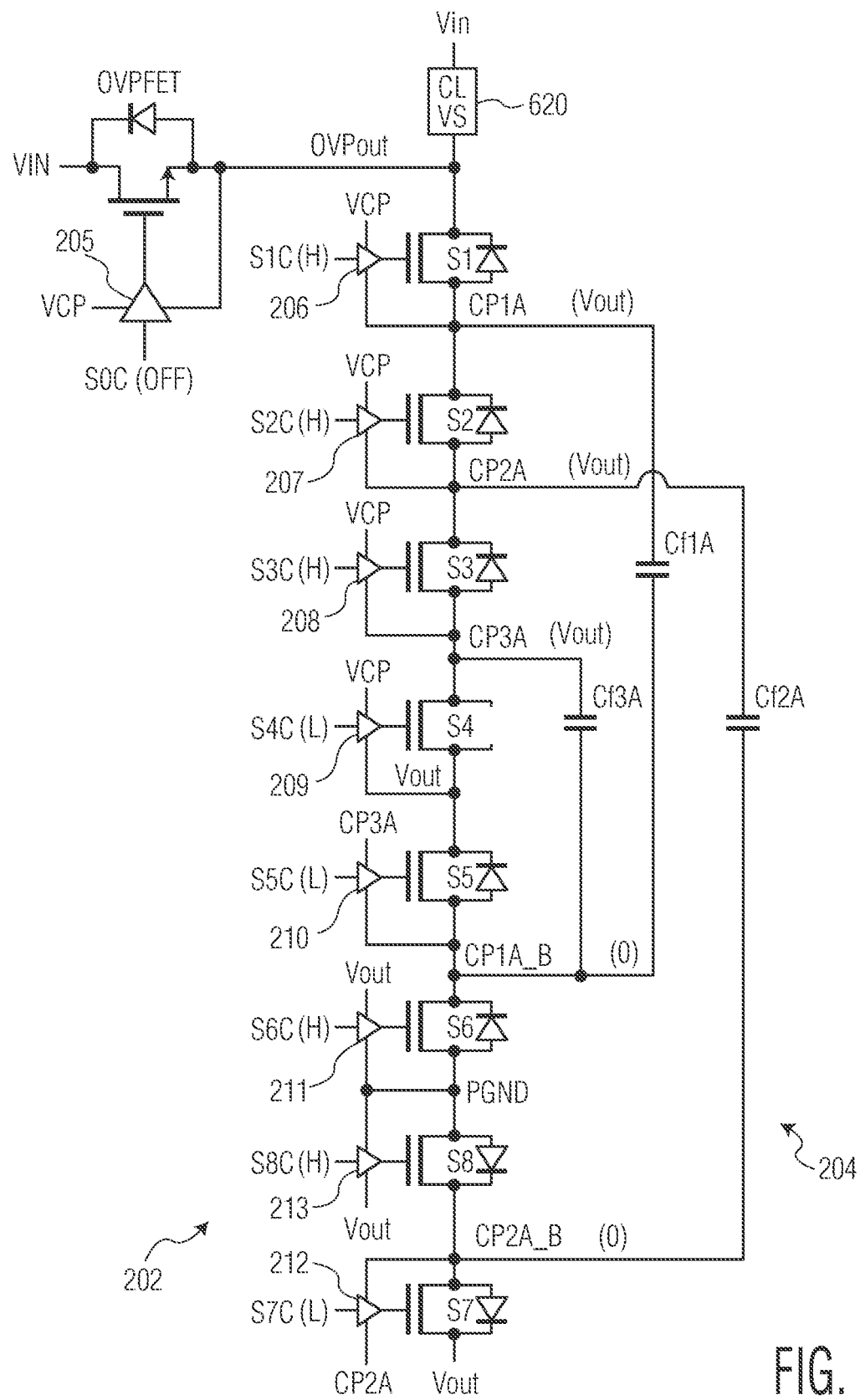
FIGS. 15-18 illustrates, in partial block diagram and partial schematic form, a portion of the fast charger of FIG. 1 at different times during a precharge method, in accordance with one embodiment of the present invention.

In the embodiment of FIG. 19, OVPout is also getting explicitly charged due to the location of CLVS 620 (unlike CLVS 510 which is not coupled to provide current directly to OVPout but to node CP1A). As will be seen in FIGS. 15-18, OVPout is also charged after flying caps Cf1A-Cf3A are charged. FIG. 19 begins with block 602 in which S0C is set to a logic level low to turn off OVPFET. Next, in block 604, S1C-S8C are each set so as to turn on switches S1, S2, S3, S6, and S8 and turn off S4, S5, and S7. This is illustrated in FIG. 15 with the values of S1C-S8C being HHHLLHLH, respectively. In this manner, nodes CP1A_B and CP2A_B are at PGND (0V), while nodes CP1A, CP2A, CP3A, and OVPout are each precharged to Vout. As in methods 300, 400, and 500, note that CP1A, CP2A, and CP3A are continuously monitored during precharge for short detection.

Figure 16:
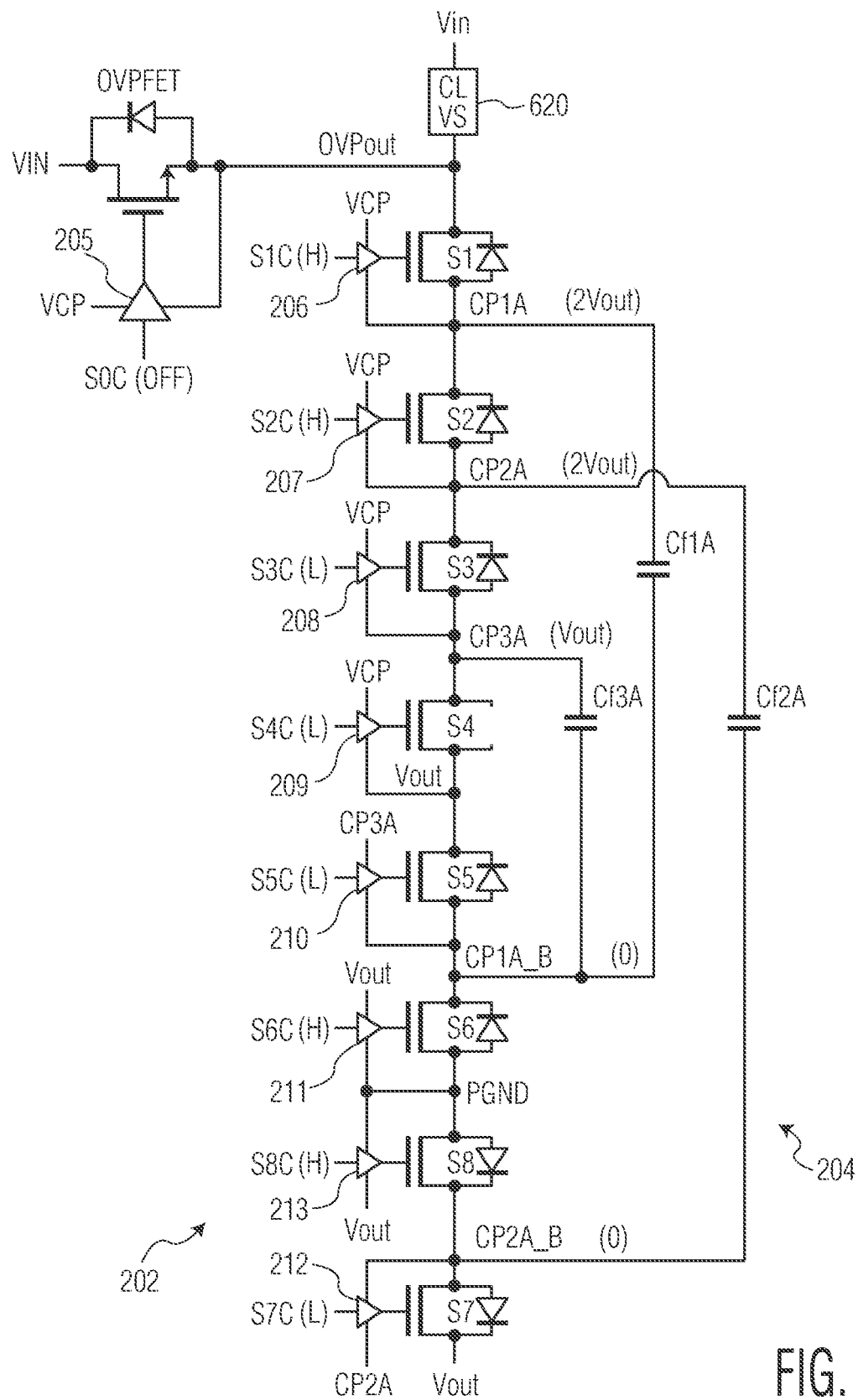

With each of Cf1A-Cf3A charged to Vout, in block 606, S1C-S8C are set so as to turn on S1, S2, S6, and S8, and turn off S3, S4, S5, and S7. This is illustrated in FIG. 16 with the values of S1C-S8C being HHLLLHLH, respectively. In this manner, nodes CP1A and CP2A (and thus Cf1A and Cf2A) are each precharged in parallel to "2×Vout", while CP3A remains at Vout. OVPout is also precharged to "2×Vout" since S1 remains on, connecting OVPout to CP1A. Nodes CP1A, CP2A, and CP3A are monitored for short detection.

Next, in block 608, S1C-S8C are set so as to turn on S1, S6 and S8, and turn off S2, S3, S4, S5, and S7. This is illustrated in FIG. 17 with the values of S1C-S8C being HLLLLHLH, respectively. In this manner, node CP1A (and thus Cf1A) is precharged to "3×Vout", while CP2A remains at "2×Vout" and CP3A remains at Vout. OVPout is also charged to "3×Vout". Nodes CP1A, CP2A, and CP3A are monitored for short detection.

Next, in block 610, S1C-S8C are set to turn off each of S1-S8. This is illustrated in FIG. 18 with the values of S1C-S8C being all L. This results in OVPout being precharged to "4×Vout" due to the placement of CLVS 620 (as compared to the placement of CLVS 520 in which OVPout only ends up being precharged to about "3×Vout"). Next, in block 512, S0C is set so as to turn on OVPFET. After the precharging of blocks 504-512 to gradually charge the flying capacitors to the appropriate values for a 4:1 conversion, in block 614, the SC converter of fast charger 122 is placed into normal active mode with full switching, in which OVPFET is on and each of S1C-S8C are controlled in accordance with a Dickson topology to implement the 4:1 ratio.

Note that for each of the embodiments of FIGS. 9, 14, and 19, for the case of a 2:1 ratio (or other selected ratio), the precharging of the nodes may be the same as described above for OVPout, and CP1A-CP3A (but Vin may be set to a different value depending on the ratio, such as 10V vs 40V for 4:1). However, once the SC converter of fast charger 122 is placed into normal active mode, in which OVPFET is on, each of S1C-S8C is controlled as needed in accordance with a Dickson topology to implement the appropriate ratio. Note that with any of the method of FIGS. 3, 9, 14, and 19, only a single CLVS is needed to pre-charge OVPout, and CP1A-CP3A. In the methods of FIGS. 3, 14 and 19, a separate CLVS (e.g. 222, 520, or 620) is used for precharging, while for the method of FIG. 4, the OVPFET is reused as a CLVS for the precharging. However, regardless of the method, only one CLVS is used to precharge all the flying capacitors, as opposed to having a CLVS coupled to each flying capacitor to precharge the flying capacitors.

The methods of FIGS. 3, 9, 14, and 19 can all be used for a dual phase SC converter to precharge the flying capacitors of both power stage 202 and power stage 201. In the case of reusing the OVPFET as the CLVS, or the case where the CLVS is coupled to OVPout (e.g. CLVS 620), the same CLVS is used to precharge both power stages (e.g. 201 and 202) by providing current to both power stages simultaneously during precharge. In the case with the CLVS coupled to CP1A, then a CLVS may be present for each of power stage 201 and power stage 202. However, even in this example, a single CLVS can be used to precharge all the fly capacitors of a power stage.

By now it can be appreciated how any of the above precharging methods (e.g. methods 300, 400, 500, or 600) provide for a start-up of an SC converter of a fast charger, implemented with a Dickson topology, with a gradual precharging of the flying capacitors. For example, in each of methods 400, 500, and 600 the flying caps are precharged in a step by step manner over a period of time with different switch configurations. Therefore, by using a Dickson topology for the SC converter, any forward or reverse mode conversion ratio can be implemented, as needed by the application, which provides flexibility for a fast charger and avoids the need to cascade multiple SC converters with fixed conversion ratios to achieve a desired conversion ratio for a fast charger (which is less power efficient as compared to not cascading multiple SC converters). Also, through the use of a Dickson topology for the SC converter, the SC converter can provide a reverse conversion ratio which allows for power to be provided from the battery to another device via Vin. Regardless of the conversion ratio of the Dickson SC converter, though, the methods described here provide for an appropriate precharging of the flying caps of a power stage of the SC converter using just a single voltage source (e.g. Vout, as in method 300, or Vin, as in methods 400, 500, and 600)) and, at most, a single CLVS. The precharge methods may help ensure that none of the switches or capacitors (e.g. capacitors or switches) are overstressed (i.e. pushed beyond their voltage ratings).

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Some of the above embodiments, as applicable, may be implemented using a variety of different information processing systems. For example, although FIG. 1 and the discussion thereof describe an exemplary information processing architecture for a mobile device, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, PMOS transistors rather than NMOS transistors may be used to implemented the Dickson topology for the SC converter. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

In one embodiment, an integrated circuit (IC) includes a switched capacitor (SC) power stage circuit that includes a first stage circuit with a first set of switches coupled in series, each switch of the first set of switches operate independently of one another; a first flying capacitor including a first terminal coupled to a first node between a first and a second of the first set of switches and a second terminal coupled to a second node between a fifth and a sixth of the first set of switches; a second flying capacitor including a first terminal coupled to a third node between the second and a third of the first set of switches, and a second terminal coupled to a fourth node between a seventh and an eighth of the first set of switches; a third flying capacitor including a first terminal coupled to a fifth node between a third and a fourth of the first set of switches, and a second terminal coupled to the second node; and a SC control circuit operable to provide signals to establish: a first configuration of the first set of switches to precharge the first, second and third flying capacitors to a first voltage supplied by a current limited voltage source, and a second configuration of the first set of switches to precharge the first and second flying capacitors to a second voltage while the third flying capacitor remains charged at the first voltage. In one aspect, the SC power stage circuit further includes a second stage circuit with a second set of switches coupled in series, each switch of the second set of switches operated independently of one another; a fourth flying capacitor including a first terminal coupled to a first node between a first and a second of the second set of switches and a second terminal coupled to a second node between a fifth and a sixth of the second set of switches; a fifth flying capacitor including a first terminal coupled to a third node between the second and a third of the second set of switches, and a second terminal coupled to a fourth node between a seventh and an eighth of the second set of switches; a sixth flying capacitor including a first terminal coupled to a fifth node between a third and a fourth of the second set of switches, and a second terminal coupled to the second node, and the SC control circuit is further operable to provide signals to establish: a first configuration of the second set of switches to precharge the fourth, fifth and sixth flying capacitors to the first voltage supplied by the current limited voltage source, and a second configuration of the second set of switches to precharge the fourth and fifth flying capacitors to the second voltage while the sixth flying capacitor remains charged at the first voltage. In a further aspect, the SC control circuit is further configured to control operation of the first and second sets of switches to enable the SC power stage circuit to provide charging capability at multiple selectable forward and reverse voltage conversion ratios. In another aspect, the IC further includes an over-voltage protection switch (OVPFET) including a first terminal coupled to an input voltage, a second terminal coupled to provide an over-voltage protection output voltage to the SC power stage circuit. In another further aspect, the SC power stage circuit further includes an output node; and a battery power supply coupled between the output node and ground. In yet a further aspect, the SC power stage circuit further includes a seventh capacitor coupled between the output node and ground. In yet an even further aspect, the output node has a first terminal coupled between the fourth and fifth switches of the first set of switches, and a second terminal coupled between the fourth and fifth switches of the second set of switches. In another further aspect, the IC further includes a voltage monitoring circuit coupled to the SC power stage circuit; and a short detection circuit coupled to the voltage monitoring circuit and the SC power stage circuit, wherein the SC control circuit proceeds with precharge operations when no short is detected by the short detection circuit in the first, second and third flying capacitors in the first and second stage circuits. In another aspect of the above embodiment, the SC control circuit is further configured to provide signals to establish a third configuration of the first set of switches to precharge the first capacitor to a third voltage while the second flying capacitor remains charged at the second voltage and third flying capacitor remains charged at the first voltage. In another aspect, the IC further includes an inductive charger circuit coupled to receive an input voltage and a battery voltage, and to provide power to a system, wherein the SC power stage circuit is used for fast charging when a charge level is within a specified range and the inductive charger circuit is used when the charge level is outside the specified range.

In another embodiment, a mobile device includes a switched capacitor (SC) converter having a Dickson topology that includes first, second and third flying capacitors switchably coupled to a current limited voltage supply; a SC control circuit coupled to the SC converter and configured to operate a first set of switches to connect the first, second and third flying capacitors to a first voltage at a first level in a first precharge configuration, connect the first and second flying capacitors to a second voltage at a second level in a second precharge configuration while the third flying capacitor remains charged at the first level, and connect the first flying capacitor to a third voltage at a third level in a third precharge configuration while the third flying capacitor remains charged at the first level and the second flying capacitor remains charged at the second level; and the device further includes an internal system coupled to receive power from the SC converter. In a further aspect, the SC converter further includes fourth, fifth and sixth flying capacitors switchably coupled to the current limited voltage supply, wherein the SC control circuit is further configured to operate a second set of switches to connect the fourth, fifth and sixth flying capacitors to the first voltage at the first level in the first precharge configuration, connect the fourth and fifth flying capacitors to the second voltage at the second level in the second precharge configuration while the sixth flying capacitor remains charged at the first level, and connect the fourth flying capacitor to the third voltage at the third level in the third precharge configuration while the sixth flying capacitor remains charged at the first level and the fifth flying capacitor remains charged at the second level; and the device further includes a batter coupled to the SC converter. In a further aspect, the device further includes a receiver device connected to receive power from the mobile device. In another further aspect, the current limited voltage supply (CLVS) is provided by one of a group consisting of: a low dropout regulator (LDO) with a current limiting function, a current limiting resistor divider, a current limiting resistor coupled to a source-follower configured transistor, a current mirror with feedback voltage regulation, and a current mirror with a feedback voltage hysteresis comparator. In another further aspect, the first and fourth flying capacitors have a capacitance to store voltage up to the third level, the second and fifth flying capacitors have a capacitance to store voltage up to the second level, and the third and sixth capacitors have a capacitance to store voltage up to the first level. In yet another further aspect, the SC control circuit is configured to control operation of the first and second sets of switches to enable the first and second stage circuits to operate at multiple forward and reverse voltage conversion ratios.

In yet another embodiment, a switched capacitor (SC) voltage converter implements a Dickson topology and includes an over-voltage protection field effect transistor (OVPFET), switches coupled to the OVPFET that are controllable to operate in different configurations for different conversion ratios, and flying capacitors coupled to the switches, and a method of operating the SC voltage converter includes precharging the flying capacitors to a first voltage value using a voltage source that is powered by a battery; if the SC voltage converter is in a forward mode of operation, turning the OVPFET off, and if the SC voltage converter is in a reverse mode of operation, turning the OVPFET on; using the battery to continue precharging the flying capacitors by placing the SC converter in a current-limited active mode of operation during a start-up phase, wherein during the current-limited active mode of operation, the switches are controlled in accordance with the Dickson topology to implement a selected conversion ratio of the SC voltage converter while applying a gate-to-source voltage limited gate drive on a subset of the switches; and once the start-up phase is complete, entering a normal active mode of operation in which the switches are controlled in accordance with the Dickson topology to implement the selected conversion ratio in which no switches are operated with current limits. In one aspect of the yet another embodiment, the method further includes determining if there is a short in any of the flying capacitors; and discontinuing precharging the flying capacitors when a short is detected. In another aspect, the method further includes, in the forward mode of operation, turning on the OVPFET once a voltage level for the selected conversion ratio is achieved. In yet another aspect of the yet another embodiment, the method further includes using the SC voltage converter for fast charging when a charge level of a battery is within a specified range; and using an inductive charger circuit when the charge level of the battery is outside the specified range.

The invention claimed is:

1. An integrated circuit comprising:
   a switched capacitor (SC) power stage circuit that includes a first stage circuit with a first set of switches coupled in series, each switch of the first set of switches operate independently of one another;
   a first flying capacitor including a first terminal coupled to a first node between a first and a second of the first set of switches and a second terminal coupled to a second node between a fifth and a sixth of the first set of switches;
   a second flying capacitor including a first terminal coupled to a third node between the second and a third of the first set of switches, and a second terminal coupled to a fourth node between a seventh and an eighth of the first set of switches;
   a third flying capacitor including a first terminal coupled to a fifth node between a third and a fourth of the first set of switches, and a second terminal coupled to the second node;
   a SC control circuit operable to provide signals to establish:
     a first configuration of the first set of switches to precharge the first, second and third flying capacitors to a first voltage supplied by a current limited voltage source; and
     a second configuration of the first set of switches to precharge the first and second flying capacitors to a second voltage while the third flying capacitor remains charged at the first voltage.

2. The integrated circuit of claim 1, the SC power stage circuit further comprising:
   a second stage circuit with a second set of switches coupled in series, each switch of the second set of switches operated independently of one another;
   a fourth flying capacitor including a first terminal coupled to a first node between a first and a second of the second set of switches and a second terminal coupled to a second node between a fifth and a sixth of the second set of switches;
   a fifth flying capacitor including a first terminal coupled to a third node between the second and a third of the second set of switches, and a second terminal coupled to a fourth node between a seventh and an eighth of the second set of switches;
   a sixth flying capacitor including a first terminal coupled to a fifth node between a third and a fourth of the second set of switches, and a second terminal coupled to the second node;
   the SC control circuit is further operable to provide signals to establish:
     a first configuration of the second set of switches to precharge the fourth, fifth and sixth flying capacitors to the first voltage supplied by the current limited voltage source; and
     a second configuration of the second set of switches to precharge the fourth and fifth flying capacitors to the second voltage while the sixth flying capacitor remains charged at the first voltage.

3. The integrated circuit of claim 2 wherein the SC control circuit is further configured to:

control operation of the first and second sets of switches to enable the SC power stage circuit to provide charging capability at multiple selectable forward and reverse voltage conversion ratios.

4. The integrated circuit of claim 2, the SC power stage circuit further comprising:
an output node;
a battery power supply coupled between the output node and ground.

5. The integrated circuit of claim 4, the SC power stage circuit further comprising:
a seventh capacitor coupled between the output node and ground.

6. The integrated circuit of claim 5 wherein:
the output node has a first terminal coupled between the fourth and fifth switches of the first set of switches, and a second terminal coupled between the fourth and fifth switches of the second set of switches.

7. The integrated circuit of claim 2, further comprising:
a voltage monitoring circuit coupled to the SC power stage circuit; and
a short detection circuit coupled to the voltage monitoring circuit and the SC power stage circuit, wherein the SC control circuit proceeds with precharge operations when no short is detected by the short detection circuit in the first, second and third flying capacitors in the first and second stage circuits.

8. The integrated circuit of claim 1 further comprising:
an over-voltage protection switch (OVPFET) including a first terminal coupled to an input voltage, a second terminal coupled to provide an over-voltage protection output voltage to the SC power stage circuit.

9. The integrated circuit of claim 1, wherein the SC control circuit is further configured to provide signals to establish:
a third configuration of the first set of switches to precharge the first capacitor to a third voltage while the second flying capacitor remains charged at the second voltage and third flying capacitor remains charged at the first voltage.

10. The integrated circuit of claim 1 further comprising:
an inductive charger circuit coupled to receive an input voltage and a battery voltage, and to provide power to a system,
wherein the SC power stage circuit is used for fast charging when a charge level is within a specified range and the inductive charger circuit is used when the charge level is outside the specified range.

11. A mobile device comprising:
a switched capacitor (SC) converter having a Dickson topology that includes first, second and third flying capacitors switchably coupled to a current limited voltage supply (CLVS or OVPOUT);
a SC control circuit coupled to the SC converter and configured to operate a first set of switches to:
connect the first, second and third flying capacitors to a first voltage at a first level in a first precharge configuration;
connect the first and second flying capacitors to a second voltage at a second level in a second precharge configuration while the third flying capacitor remains charged at the first level; and
connect the first flying capacitor to a third voltage at a third level in a third precharge configuration while the third flying capacitor remains charged at the first level and the second flying capacitor remains charged at the second level; and an internal system coupled to receive power from the SC converter.

12. The device of claim 11 wherein:
the SC converter further includes fourth, fifth and sixth flying capacitors switchably coupled to the current limited voltage supply (CLVS or OVPOUT), wherein the SC control circuit is further configured to operate a second set of switches to:
connect the fourth, fifth and sixth flying capacitors to the first voltage at the first level in the first precharge configuration;
connect the fourth and fifth flying capacitors to the second voltage at the second level in the second precharge configuration while the sixth flying capacitor remains charged at the first level; and
connect the fourth flying capacitor to the third voltage at the third level in the third precharge configuration while the sixth flying capacitor remains charged at the first level and the fifth flying capacitor remains charged at the second level; and
the device further includes a battery coupled to the SC converter.

13. The device of claim 12 further comprising:
a receiver device connected to receive power from the mobile device.

14. The device of claim 12 wherein:
the current limited voltage supply (CLVS) is provided by one of a group consisting of: a low dropout regulator (LDO) with a current limiting function, a current limiting resistor divider, a current limiting resistor coupled to a source-follower configured transistor, a current mirror with feedback voltage regulation, and a current mirror with a feedback voltage hysteresis comparator.

15. The device of claim 12 wherein the first and fourth flying capacitors have a capacitance to store voltage up to the third level, the second and fifth flying capacitors have a capacitance to store voltage up to the second level, and the third and sixth capacitors have a capacitance to store voltage up to the first level.

16. The device of claim 12 wherein the SC control circuit is configured to control operation of the first and second sets of switches to enable the first and second stage circuits to operate at multiple forward and reverse voltage conversion ratios.

17. A method of operating a switched capacitor (SC) voltage converter, wherein the SC voltage converter implements a Dickson topology and includes an over-voltage protection field effect transistor (OVPFET), switches coupled to the OVPFET that are controllable to operate in different configurations for different conversion ratios, and flying capacitors coupled to the switches, the method comprising:
precharging the flying capacitors to a first voltage value using a voltage source that is powered by a battery;
if the SC voltage converter is in a forward mode of operation, turning the OVPFET off, and if the SC voltage converter is in a reverse mode of operation, turning the OVPFET on;
using the battery to continue precharging the flying capacitors by placing the SC converter in a current-limited active mode of operation during a start-up phase, wherein during the current-limited active mode of operation, the switches are controlled in accordance with the Dickson topology to implement a selected conversion ratio of the SC voltage converter while applying a gate-to-source voltage limited gate drive on a subset of the switches;

once the start-up phase is complete, entering a normal active mode of operation in which the switches are controlled in accordance with the Dickson topology to implement the selected conversion ratio in which no switches are operated with current limits;

determining if there is a short in any of the flying capacitors; and discontinuing precharging the flying capacitors when a short is detected.

18. The method of claim 17 further comprising:

in the forward mode of operation, turning on the OVPFET once a voltage level for the selected conversion ratio is achieved.

19. A method of operating a switched capacitor (SC) voltage converter, wherein the SC voltage converter implements a Dickson topology and includes an over-voltage protection field effect transistor (OVPFET), switches coupled to the OVPFET that are controllable to operate in different configurations for different conversion ratios, and flying capacitors coupled to the switches, the method comprising:

precharging the flying capacitors to a first voltage value using a voltage source that is powered by a battery;

if the SC voltage converter is in a forward mode of operation, turning the OVPFET off, and if the SC voltage converter is in a reverse mode of operation, turning the OVPFET on;

using the battery to continue precharging the flying capacitors by placing the SC converter in a current-limited active mode of operation during a start-up phase, wherein during the current-limited active mode of operation, the switches are controlled in accordance with the Dickson topology to implement a selected conversion ratio of the SC voltage converter while applying a gate-to-source voltage limited gate drive on a subset of the switches;

once the start-up phase is complete, entering a normal active mode of operation in which the switches are controlled in accordance with the Dickson topology to implement the selected conversion ratio in which no switches are operated with current limits;

using the SC voltage converter for fast charging when a charge level of a battery is within a specified range; and using an inductive charger circuit when the charge level of the battery is outside the specified range.

* * * * *